(12) United States Patent
Gras et al.

(10) Patent No.: US 11,675,638 B1
(45) Date of Patent: Jun. 13, 2023

(54) WEBHOOKS USE FOR A MICROSERVICE ARCHITECTURE APPLICATION

(71) Applicant: KONG INC., San Francisco, CA (US)

(72) Inventors: Lluís Esquerda Gras, Barcelona (ES); Rob Serafini, San Francisco, CA (US); Shane Connelly, San Rafael, CA (US)

(73) Assignee: KONG INC., San Francisco, CA (US)

( * ) Notice: Subject to any disclaimer, the term of this patent is extended or adjusted under 35 U.S.C. 154(b) by 0 days.

(21) Appl. No.: 17/935,531

(22) Filed: Sep. 26, 2022

(51) Int. Cl.
*G06F 9/54* (2006.01)
*H04L 67/02* (2022.01)
*H04L 67/288* (2022.01)

(52) U.S. Cl.
CPC .............. *G06F 9/542* (2013.01); *H04L 67/02* (2013.01); *H04L 67/288* (2013.01)

(58) Field of Classification Search
CPC ...... G06F 9/541; G06F 9/542; G06F 16/1734; H04L 41/06; H04L 41/0604
USPC .................................................. 719/318, 328
See application file for complete search history.

(56) References Cited

U.S. PATENT DOCUMENTS

| | | | |
|---|---|---|---|
| 11,093,232 B2 * | 8/2021 | Maréchal | G06F 11/3688 |
| 11,323,508 B2 * | 5/2022 | Moore | H04L 67/1001 |
| 11,457,080 B1 * | 9/2022 | Meduri | H04L 67/60 |

* cited by examiner

*Primary Examiner* — Andy Ho
(74) *Attorney, Agent, or Firm* — Perkins Coie LLP; Bailey Meyer; Colin Fowler

(57) ABSTRACT

Disclosed embodiments are directed at systems, methods, and architecture for configuring event hooks in a microservice architecture-based system. The control plane links a plurality of APIs for a microservice architecture application. Each API includes a data plane proxy that serves traffic for the API from the control plane. The control plane receives an event hook including an event, a source, and a handler. The control plane configures a component of the microservice-architecture-based system to run the handler when the event occurs at the source. When the event occurred at the source, the component runs the handler.

20 Claims, 16 Drawing Sheets

(DISTRIBUTED API GATEWAY)

WEBHOOKS USE FOR A MICROSERVICE ARCHITECTURE APPLICATION

TECHNICAL FIELD

The disclosure relates to distributed microservice architecture networks and more particularly to using webhooks to configure microservices.

BACKGROUND

Microservices are a software development technique—a variant of the service-oriented architecture (SOA) architectural style that structures an application as a collection of loosely coupled services (embodied in application program interfaces). In a microservices architecture, services are fine-grained and the protocols are lightweight. The benefit of decomposing an application into different smaller services is that it improves modularity. This makes the application easier to understand, develop, test, and become more resilient to architecture erosion. Microservices parallelize development by enabling small autonomous teams to develop, deploy and scale their respective services independently. Microservice-based architectures enable continuous delivery and deployment.

A system may monitor a plurality of microservices to ensure proper processing of data for applications running via the microservices. However, in some instances, the system may also need to more closely monitor when particular events occur in order to take action. For example, to bolster system security, an administrator may want to configure the system to track when new administrators are created. In other example, the system may need to track when new plugins are added to latency-sensitive routes so that the system may properly route data between the microservices or, if necessary, remove the plugins. Thus, a method for tracking when events occur within a microservice architecture-based system is necessary.

DETAILED DESCRIPTION

Figure 1A:
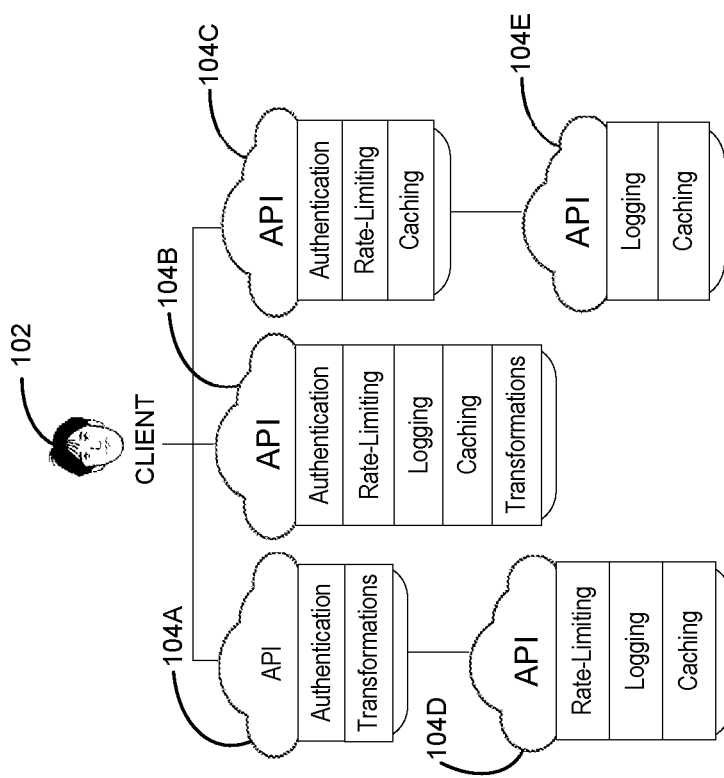
FIG. 1A illustrates a prior art approach with multiple APIs having functionalities common to one another.

The disclosed technology describes how a control plane configures microservices in a microservice application architecture with webhooks (referred to herein as event hooks). In network routing, the control plane is the part of the router architecture that is concerned with drawing the network topology, or the routing table that defines what to do with incoming packets. Control plane logic also can define certain packets to be discarded, as well as preferential treatment of certain packets for which a high quality of service is defined by such mechanisms as differentiated services.

In monolithic application architecture, a control plane operates outside the core application. In a microservices architecture, the control plane operates between each application programming interface (API) that makes up the microservice architecture. Proxies operate linked to each API. The proxy attached to each API is referred to as a "data plane proxy." Examples of a data plane proxy include the sidecar proxies of Envoy proxies. The control plane monitors the operations of the APIs (e.g., microservices) based on output data received from the APIs and communicates settings and input data with the APIs to run one or more microservice architecture applications.

The control plane connects clients to the microservice architecture applications to facilitate processes for the clients. The control plane receives requests from the clients regarding events they want to monitor and configures APIs to take action (e.g., run a handler) when the events occur. Thus, the control plane monitors output data from the APIs, clients, and external applications and notifies a configured API when an event at a particular source occurs, such that the API runs a handler requested by the client.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any exemplified term. Likewise, the disclosure is not limited to various embodiments given in this specification.

Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Embodiments of the present disclosure are directed at systems, methods, and architecture for management and configuration of microservices that together comprise one or more applications. The architecture is a distributed plurality of microservices that each perform processes for the applications. The plurality of microservices are connected at a control plane that monitors the output data from the microservices for running the applications. At the request of a client, the control plane configures microservices with event hooks, such that when a particular event occurs at a particular source, a configured microservice runs a particular handler. The control thus employs the event hooks to automatically take action when events occur in at a microservice, client, or external application.

FIG. 1A illustrates a prior art approach with multiple APIs having functionalities common to one another. As shown in FIG. 1A, a client 102 is associated with APIs 104A, 104B, 104C, 104D, and 104E. Each API has a standard set of features or functionalities associated with it. For example, the standard set of functionalities associated with API 104A are "authentication" and "transformations." The standard set of functionalities associated with API 104B are "authentication," "rate-limiting," "logging," "caching," and "transformations." Thus, "authentication" and "transformations" are functionalities that are common to APIs 104A and 104B. Similarly, several other APIs in FIG. 1A share common functionalities. However, it is noted that having each API handle its own functionalities individually causes duplication of efforts and code associated with these functionalities, which is inefficient. This problem becomes significantly more challenging when there are tens of thousands of APIs and millions of clients requesting API-related services per day.

Figure 1B:
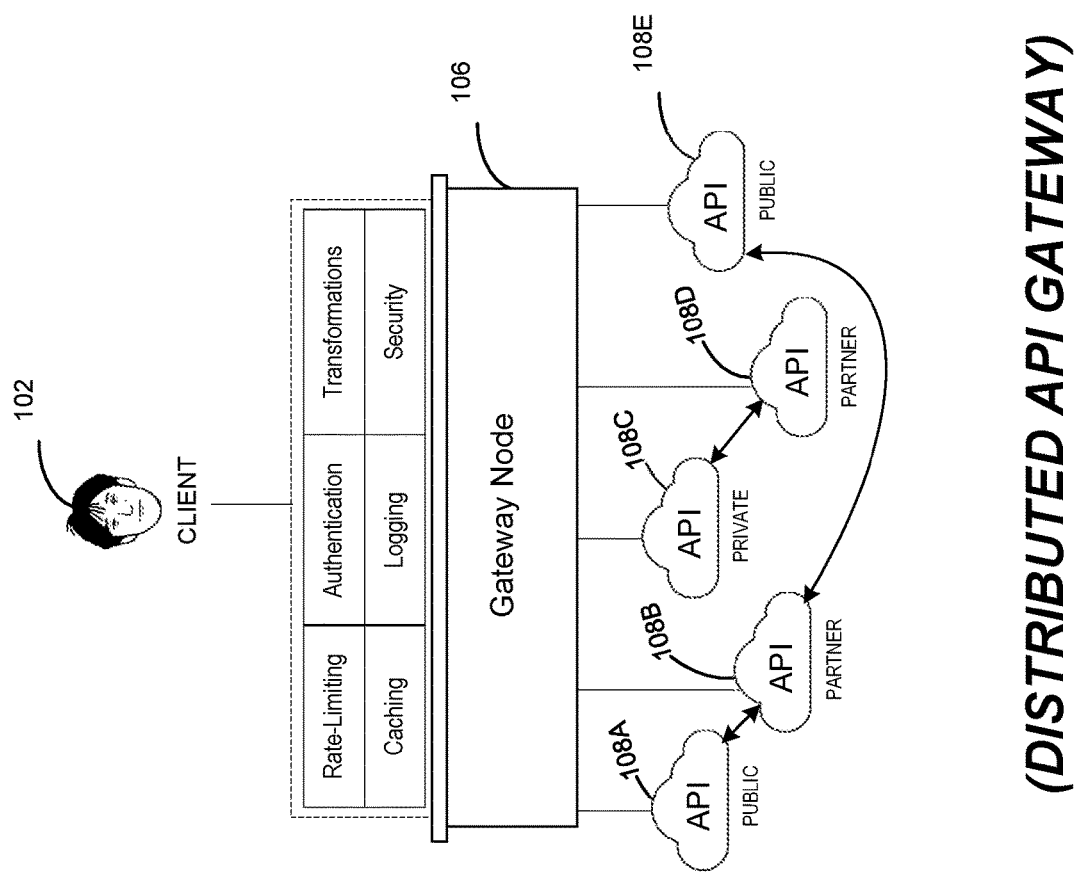
FIG. 1B illustrates a distributed API gateway architecture, according to an embodiment of the disclosed technology.

FIG. 1B illustrates a distributed API gateway architecture according to an embodiment of the disclosed technology. To address the challenge described in connection with FIG. 1A, the disclosed technology provides a distributed API gateway architecture as shown in FIG. 1B. Specifically, disclosed embodiments implement common API functionalities by bundling the common API functionalities into a gateway node 106 (also referred to herein as an API Gateway). Gateway node 106 implements common functionalities as a core set of functionalities that runs in front of APIs 108A, 108B, 108C, 108D, and 108E. The core set of functionalities include rate limiting, caching, authentication, logging, transformations, and security. It will be understood that the above-mentioned core set of functionalities are for examples and illustrations. There can be other functionalities included in the core set of functionalities besides those discussed in FIG. 1B. In some applications, gateway node 106 can help launch large-scale deployments in a very short time at reduced complexity and is therefore an inexpensive replacement for expensive proprietary API management systems. The disclosed technology includes a distributed architecture of gateway nodes with each gateway node bundled with a set of functionalities that can be extended depending on the use-case or applications.

Figure 2:
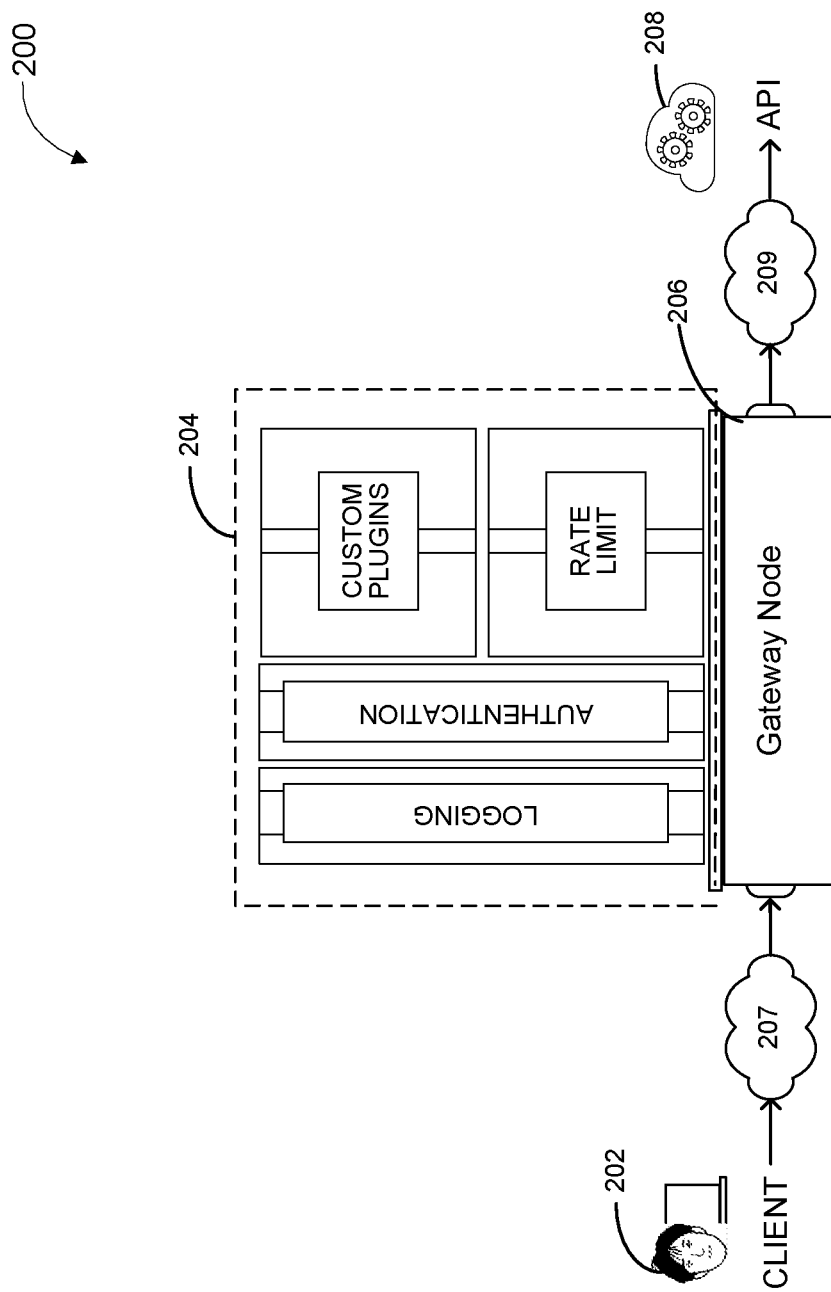
FIG. 2 illustrates a block diagram of an example environment suitable for functionalities provided by a gateway node, according to an embodiment of the disclosed technology.

FIG. 2 illustrates a block diagram of an example environment suitable for functionalities provided by a gateway node according to an embodiment of the disclosed technology. In some embodiments, a core set of functionalities are provided in the form of "plugins" or "add-ons" installed at a gateway node. (Generally, a plugin is a component that allows modification of what a system can do usually without forcing a redesign/compile of the system. When an application supports plug-ins, it enables customization. The common examples are the plug-ins used in web browsers to add new features such as search-engines, virus scanners, or the ability to utilize a new file type such as a new video format.)

As an example, a set of plugins 204 shown in FIG. 2 are provided by gateway node 206 positioned between a client 202 and one or more HTTP APIs. Electronic devices operated by client 202 can include, but are not limited to, a server desktop, a desktop computer, a computer cluster, a mobile computing device such as a notebook, a laptop computer, a handheld computer, a mobile phone, a smart phone, a PDA, and/or an iPhone or Droid device, etc. Gateway node 206 and client 202 are configured to communicate with each other via network 207. Gateway node 206 and one or more APIs 208 are configured to communicate with each other via network 209. In some embodiments, the one or more APIs reside in one or more API servers, API data stores, or one or more API hubs. Various combinations of configurations are possible.

Networks 207 and 209 can be any collection of distinct networks operating wholly or partially in conjunction to provide connectivity to/from client 202 and one or more APIs 208. In one embodiment, network communications can be achieved by, an open network, such as the Internet, or a private network, such as an intranet and/or the extranet. Networks 207 and 209 can be a telephonic network, an open network, such as the Internet, or a private network, such as an intranet and/or the extranet. For example, the Internet can provide file transfer, remote login, email, news, RSS, and other services through any known or convenient protocol, such as, but not limited to the TCP/IP protocol, Open System Interconnections (OSI), FTP, UPnP, iSCSI, NSF, ISDN, PDH, RS-232, SDH, SONET, etc.

Client 202 and one or more APIs 208 can be coupled to the network 150 (e.g., Internet) via a dial-up connection, a digital subscriber loop (DSL, ADSL), cable modem, wireless connections, and/or other types of connection. Thus, the client devices 102A-N, 112A-N, and 122A-N can communicate with remote servers (e.g., API servers 130A-N, hub servers, mail servers, instant messaging servers, etc.) that provide access to user interfaces of the World Wide Web via a web browser, for example.

The set of plugins 204 include authentication, logging, rate-limiting, and custom plugins, of which authentication, logging, traffic control, rate-limiting can be considered as the core set of functionalities. An authentication functionality can allow an authentication plugin to check for valid login credentials such as usernames and passwords. A logging functionality of a logging plugin logs data associated with requests and responses. A traffic control functionality of a traffic control plugin manages, throttles, and restricts inbound and outbound API traffic. A rate limiting functionality can allow managing, throttling, and restricting inbound and outbound API traffic. For example, a rate limiting plugin can determine how many HTTP requests a developer can make in a given period of seconds, minutes, hours, days, months or years.

A plugin can be regarded as a piece of stand-alone code. After a plugin is installed at a gateway node, it is available to be used. For example, gateway node 206 can execute a plugin in between an API-related request and providing an associated response to the API-related request. One advantage of the disclosed system is that the system can be expanded by adding new plugins. In some embodiments, gateway node 206 can expand the core set of functionalities by providing custom plugins. Custom plugins can be provided by the entity that operates the cluster of gateway nodes. In some instances, custom plugins are developed (e.g., built from "scratch") by developers or any user of the disclosed system. It can be appreciated that plugins, used in accordance with the disclosed technology, facilitate in centralizing one or more common functionalities that would be otherwise distributed across the APIs, making it harder to build, scale and maintain the APIs.

Other examples of plugins can be a security plugin, a monitoring and analytics plugin, and a transformation plugin. A security functionality can be associated with the system restricting access to an API by whitelisting or blacklisting/whitelisting one or more consumers identified, for example, in one or more Access Control Lists (ACLs). In some embodiments, the security plugin requires an authentication plugin to be enabled on an API. In some use cases, a request sent by a client can be transformed or altered before being sent to an API. A transformation plugin can apply a transformations functionality to alter the request sent by a client. In many use cases, a client might wish to monitor request and response data. A monitoring and analytics plugin can allow monitoring, visualizing, and inspecting APIs and microservices traffic.

In some embodiments, a plugin is Lua code that is executed during the life-cycle of a proxied request and response. Through plugins, functionalities of a gateway node can be extended to fit any custom need or integration challenge. For example, if a consumer of the disclosed system needs to integrate their API's user authentication with a third-party enterprise security system, it can be implemented in the form of a dedicated (custom) plugin that is run on every request targeting that given API. One advantage, among others, of the disclosed system is that the distributed cluster of gateway nodes is scalable by simply adding more nodes, implying that the system can handle virtually any load while keeping latency low.

One advantage of the disclosed system is that it is platform agnostic, which implies that the system can run anywhere. In one implementation, the distributed cluster can be deployed in multiple data centers of an organization. In some implementations, the distributed cluster can be deployed as multiple nodes in a cloud environment. In some implementations, the distributed cluster can be deployed as a hybrid setup involving physical and cloud computers. In some other implementations, the distributed cluster can be deployed as containers.

Figure 3A:
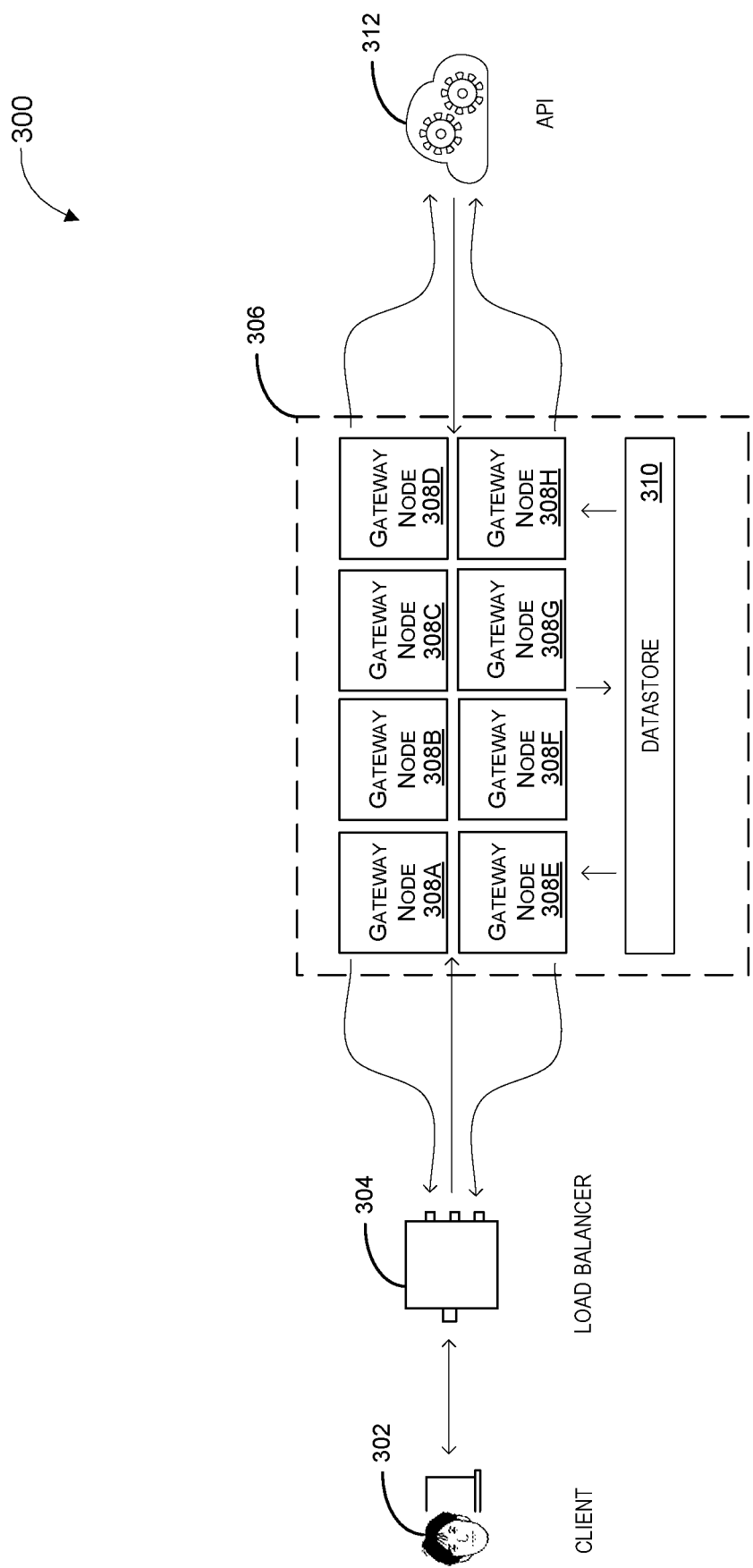
FIG. 3A illustrates a block diagram of an example environment with a cluster of gateway nodes in operation, according to an embodiment of the disclosed technology.

FIG. 3A illustrates a block diagram of an example environment with a cluster of gateway nodes in operation. In some embodiments, a gateway node is built on top of NGINX. NGINX is a high-performance, highly-scalable, highly-available web server, reverse proxy server, and web accelerator (combining the features of an HTTP load balancer, content cache, and other features). In an example deployment, a client 302 communicates with one or more APIs 312 via load balancer 304, and a cluster of gateway nodes 306. The cluster of gateway nodes 306 can be a distributed cluster. The cluster of gateway nodes 306 includes gateway nodes 308A—308H and data store 310. The functions represented by the gateway nodes 308A—308H and/or the data store 310 can be implemented individually or in any combination thereof, partially or wholly, in hardware, software, or a combination of hardware and software.

Load balancer 304 provides functionalities for load balancing requests to multiple backend services. In some embodiments, load balancer 304 can be an external load balancer. In some embodiments, the load balancer 304 can be a DNS-based load balancer. In some embodiments, the load balancer 304 can be a Kubernetes® load balancer integrated within the cluster of gateway nodes 306.

Data store 310 stores all the data, routing information, plugin configurations, etc. Examples of a data store can be Apache Cassandra or PostgreSQL. In accordance with disclosed embodiments, multiple gateway nodes in the cluster share the same data store, e.g., as shown in FIG. 3A. Because multiple gateway nodes in the cluster share the same data store, there is no requirement to associate a specific gateway node with the data store—data from each gateway node 308A-308H is stored in data store 310 and retrieved by the other nodes (e.g., even in complex multiple data center setups). In some embodiments, the data store shares configurations and software codes associated with a plugin that is installed at a gateway node. In some embodiments, the plugin configuration and code can be loaded at runtime.

Figure 3B:
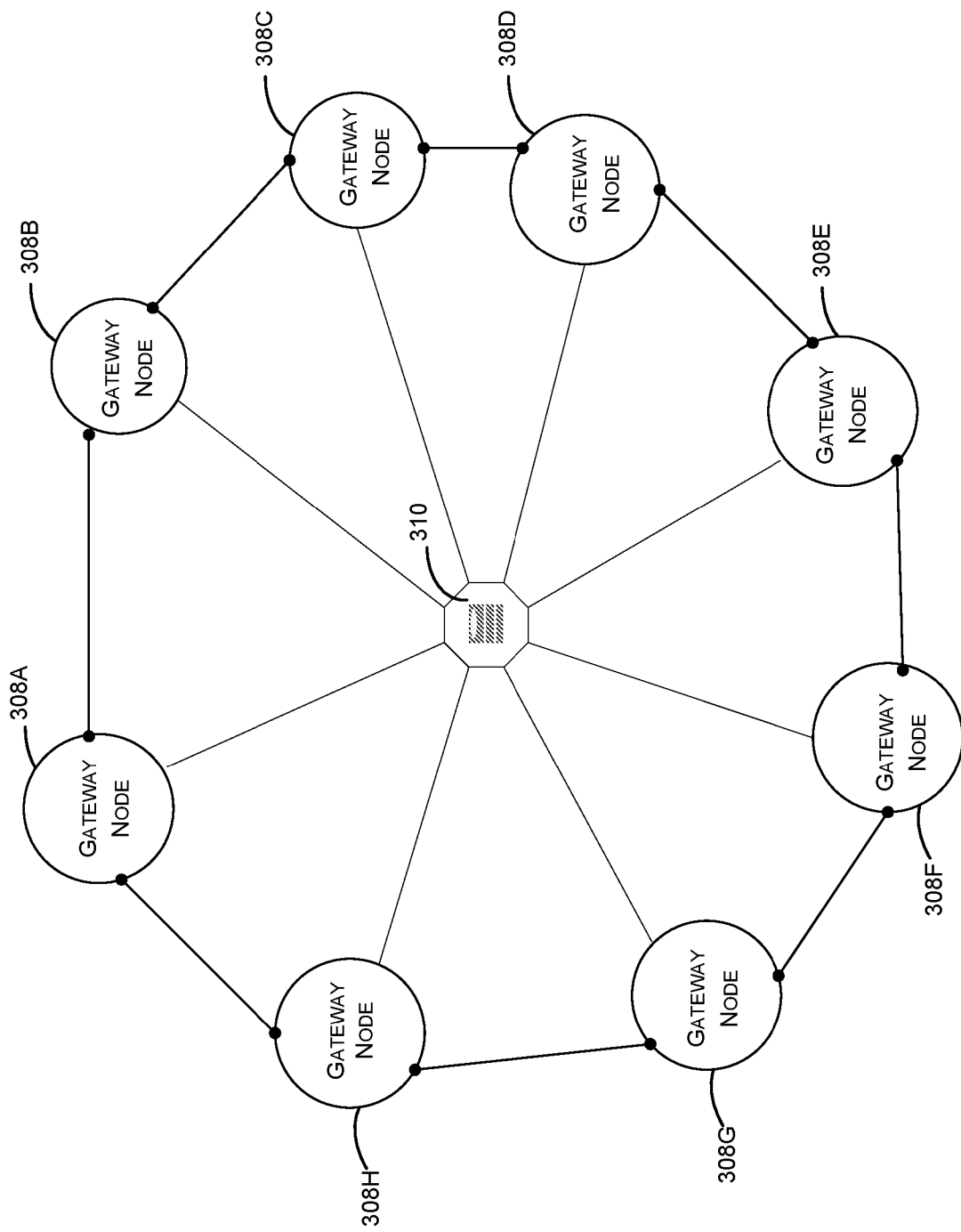
FIG. 3B illustrates a schematic of a data store shared by multiple gateway nodes, according to an embodiment of the disclosed technology.

FIG. 3B illustrates a schematic of a data store shared by multiple gateway nodes, according to an embodiment of the disclosed technology. For example, FIG. 3B shows data store 310 shared by gateway nodes 308A-308H arranged as part of a cluster.

One advantage of the disclosed architecture is that the cluster of gateway nodes allow the system to be scaled horizontally by adding more gateway nodes to encompass a bigger load of incoming API-related requests. Each of the gateway nodes share the same data since they point to the same data store. The cluster of gateway nodes can be created in one datacenter, or in multiple datacenters distributed across different geographical locations, in both cloud or on-premise environments. In some embodiments, gateway nodes (e.g., arranged according to a flat network topology) between the datacenters communicate over a Virtual Private Network (VPN) connection. The system can automatically handle a new gateway node joining a cluster or leaving a cluster. Once a gateway node communicates with another gateway node, it will automatically discover all the other gateway nodes due to an underlying gossip protocol.

In some embodiments, each gateway includes an administration API (e.g., internal RESTful API) for administration purposes. Requests to the administration API can be sent to any node in the cluster. The administration API can be a generic HTTP API. Upon set up, each gateway node is associated with a consumer port and an admin port that manages the API-related requests coming into the consumer port. For example, port number 8001 is the default port on which the administration API listens and 8444 is the default port for HTTPS (e.g., admin_listen_ssl) traffic to the administration API.

In some instances, the administration API can be used to provision plugins. After a plugin is installed at a gateway node, it is available to be used, e.g., by the administration API or a declarative configuration.

In some embodiments, the administration API identifies a status of a cluster based on a health state of each gateway node. For example, a gateway node can be in one of the following states:
  active: the node is active and part of the cluster.
  failed: the node is not reachable by the cluster.
  leaving: a node is in the process of leaving the cluster.
  left: the node has left the cluster.

In some embodiments, the administration API is an HTTP API available on each gateway node that allows the user to create, restore, update, and delete (CRUD) operations on items (e.g., plugins) stored in the data store. For example, the Admin API can provision APIs on a gateway node, provision plugin configuration, create consumers, and provision their credentials. In some embodiments, the administration API can also read, update, or delete the data. Generally, the administration API can configure a gateway node and the data associated with the gateway node in the data store.

In some applications, it is possible that the data store only stores the configuration of a plugin and not the software code of the plugin. That is, for installing a plugin at a gateway node, the software code of the plugin is stored on that gateway node. This can result in efficiencies because the user needs to update his or her deployment scripts to include the new instructions that would install the plugin at every gateway node. The disclosed technology addresses this issue by storing both the plugin and the configuration of the plugin. By leveraging the administration API, each gateway node can not only configure the plugins, but also install them. Thus, one advantage of the disclosed system is that a user does not have to install plugins at every gateway node. But rather, the administration API associated with one of the gateway nodes automates the task of installing the plugins at gateway nodes by installing the plugin in the shared data store, such that every gateway node can retrieve the plugin code and execute the code for installing the plugins. Because the plugin code is also saved in the shared data store, the code is effectively shared across the gateway nodes by leveraging the data store, and does not have to be individually installed on every gateway node.

Figure 4A:
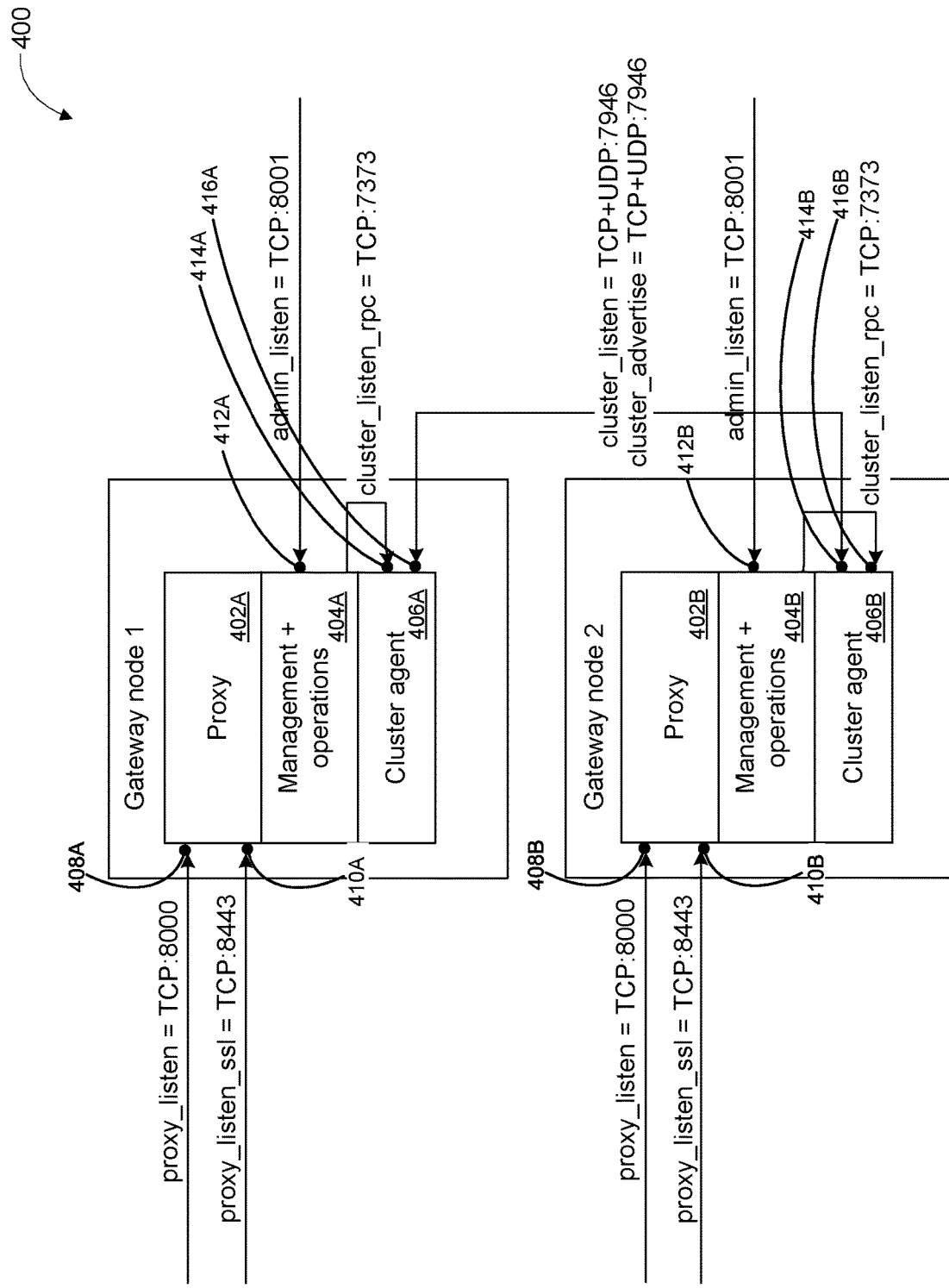
FIG. 4A and FIG. 4B illustrate example ports and connections of a gateway node, according to an embodiment of the disclosed technology.
Figure 4B:
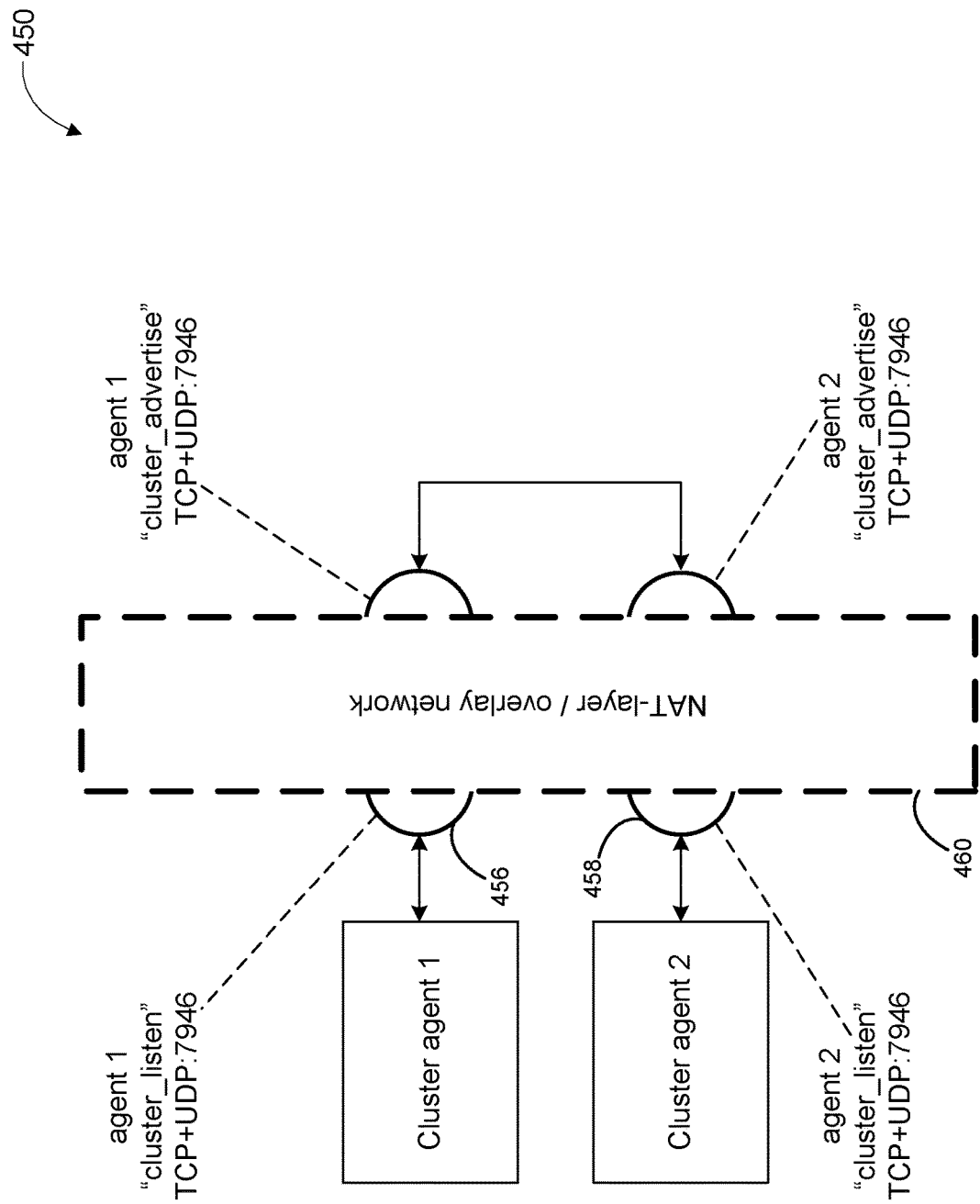

FIG. 4A and FIG. 4B illustrate example block diagrams 400 and 450 showing ports and connections of a gateway node, according to an embodiment of the disclosed technology. Specifically, FIG. 4A shows a gateway node 1 and gateway node 2. Gateway node 1 includes a proxy module 402A, a management and operations module 404A, and a cluster agent module 406A. Gateway node 2 includes a proxy module 402B, a management and operations module 404B, and a cluster agent module 406B. Gateway node 1 receive incoming traffic at ports denoted as 408A and 410A. Ports 408A and 410A are coupled to proxy module 402B.

Gateway node 1 listens for HTTP traffic at port 408A. The default port number for port 408A is 8000. API-related requests are typically received at port 408A. Port 410A is used for proxying HTTPS traffic. The default port number for port 410A is 8443. Gateway node 1 exposes its administration API (alternatively, referred to as management API) at port 412A that is coupled to management and operations module 404A. The default port number for port 412A is 8001. The administration API allows configuration and management of a gateway node, and is typically kept private and secured. Gateway node 1 allows communication within itself (i.e., intra-node communication) via port 414A that is coupled to clustering agent module 406A. The default port number for port 414A is 7373. Because the traffic (e.g., TCP traffic) here is local to a gateway node, this traffic does not need to be exposed. Cluster agent module 406B of gateway node 1 enables communication between gateway node 1 and other gateway nodes in the cluster. For example, ports 416A and 416B coupled with cluster agent module 406A at gateway node 1 and cluster agent module 406B at gateway node 2 allow intra-cluster or inter-node communication. Intra-cluster communication can involve UDP and TCP traffic. Both ports 416A and 416B have the default port number set to 7946. In some embodiments, a gateway node automatically (e.g., without human intervention) detects its ports and addresses. In some embodiments, the ports and addresses are advertised (e.g., by setting the cluster advertise property/setting to a port number) to other gateway nodes. It will be understood that the connections and ports (denoted with the numeral "B") of gateway node 2 are similar to those in gateway node 1, and hence is not discussed herein.

FIG. 4B shows cluster agent 1 coupled to port 456 and cluster agent 2 coupled to port 458. Cluster agent 1 and cluster agent 2 are associated with gateway node 1 and gateway node 2 respectively. Ports 456 and 458 are communicatively connected to one another via a NAT-layer 460. In accordance with disclosed embodiments, gateway nodes are communicatively connected to one another via a NAT-layer. In some embodiments, there is no separate cluster agent but the functionalities of the cluster agent are integrated into the gateway nodes. In some embodiments, gateway nodes communicate with each other using the explicit IP address of the nodes.

Figure 5:
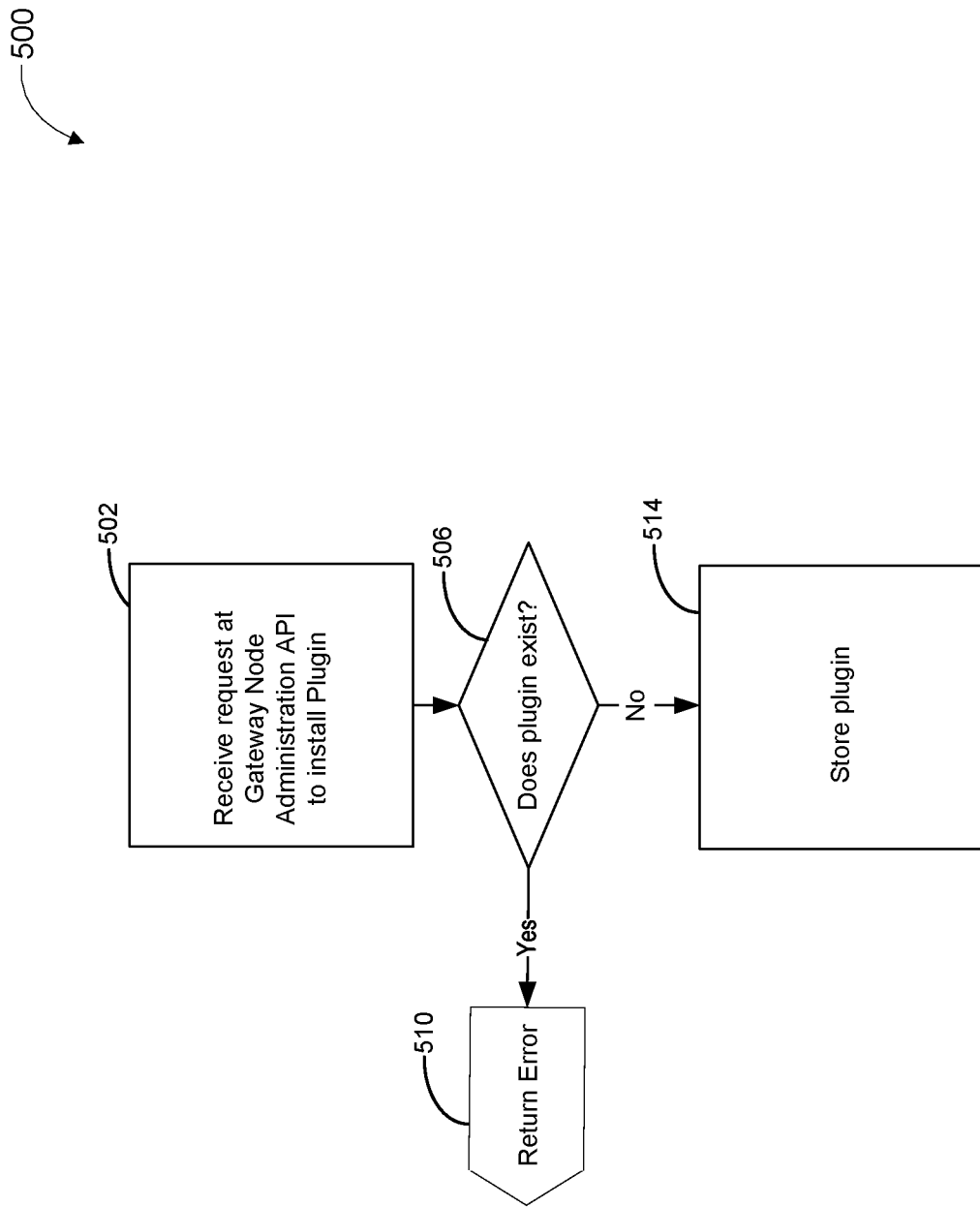
FIG. 5 illustrates a flow diagram showing steps involved in the installation of a plugin at a gateway node, according to an embodiment of the disclosed technology.

FIG. 5 illustrates a flow diagram showing steps of a process 500 involved in installation of a plugin at a gateway node, according to an embodiment of the disclosed technology. At step 502, the administration API of a gateway node receives a request to install a plugin. An example of a request is provided below:
  For example:
  POST/plugins/install
  name=OPTIONAL VALUE
  code=VALUE
  archive=VALUE The administration API of the gateway node determines (at step 506) if the plugin exists in the data store. If the gateway node determines that the plugin exists in the data store, then the process returns (step 510) an error. If the gateway node determines that the plugin does not exist in the data store, then the process stores the plugin. (In some embodiments, the plugin can be stored in an external data store coupled to the gateway node, a local cache of the gateway node, or a third-party storage. For example, if the plugin is stored at some other location besides the data store, then different policies can be implemented for accessing the plugin.) Because the plugin is now stored in the database, it is ready to be used by any gateway node in the cluster.

When a new API request goes through a gateway node (in the form of network packets), the gateway node determines (among other things) which plugins are to be loaded. Therefore, a gateway node sends a request to the data store to retrieve the plugin(s) that has/have been configured on the API and that need(s) to be executed. The gateway node communicates with the data store using the appropriate database driver (e.g., Cassandra or PostgresSQL) over a TCP communication. In some embodiments, the gateway node retrieves both the plugin code to execute and the plugin configuration to apply for the API, and then execute them at runtime on the gateway node (e.g., as explained in FIG. 6).

Figure 6:
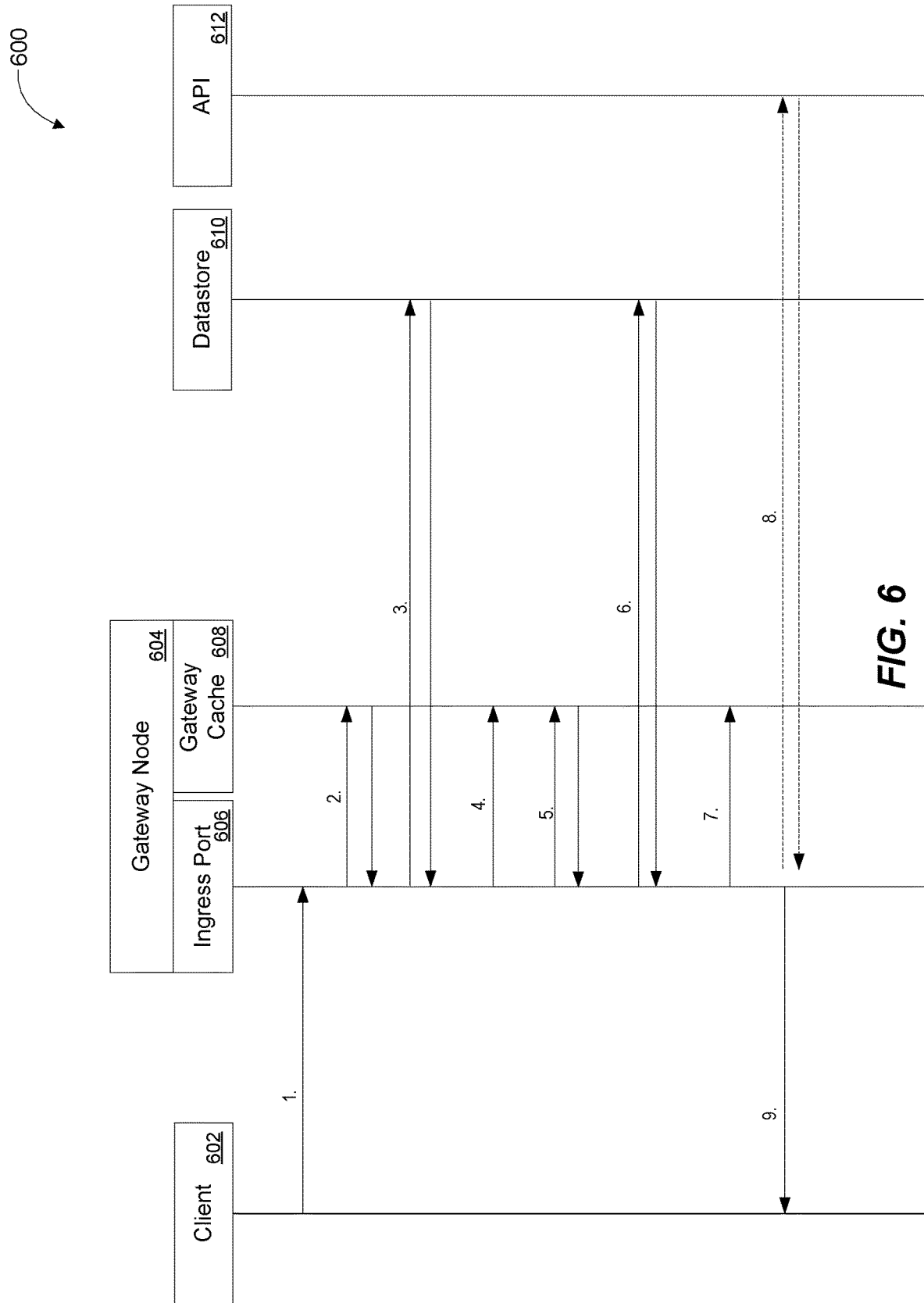
FIG. 6 illustrates a sequence diagram showing components and associated steps involved in loading configurations and code at runtime, according to an embodiment of the disclosed technology.

FIG. 6 illustrates a sequence diagram 600 showing components and associated steps involved in loading configurations and code at runtime, according to an embodiment of the disclosed technology. The components involved in the interaction are client 602, gateway node 604 (including an ingress port 606 and a gateway cache 608), data store 610, and an API 612. At step 1, a client makes a request to gateway node 604. At step 2, ingress port 606 of gateway node 604 checks with gateway cache 608 to determine if the plugin information and the information to process the request has already been cached previously in gateway cache 608. If the plugin information and the information to process the request is cached in gateway cache 608, then the gateway cache 608 provides such information to the ingress port 606. If, however, the gateway cache 608 informs the ingress port 606 that the plugin information and the information to process the request is not cached in gateway cache 608, then the ingress port 606 loads (at step 3) the plugin information and the information to process the request from data store 610. In some embodiments, ingress port 606 caches (for subsequent requests) the plugin information and the information to process the request (retrieved from data store 610) at gateway cache 608. At step 5, ingress port 606 of gateway node 604 executes the plugin and retrieves the plugin code from the cache, for each plugin configuration. However, if the plugin code is not cached at the gateway cache 608, the gateway node 604 retrieves (at step 6) the plugin code from data store 610 and caches (step 7) it at gateway cache 608. The gateway node 604 executes the plugins for the request and the response (e.g., by proxy the request to API 612 at step 7), and at step 8, the gateway node 604 returns a final response to the client.

Figure 7:
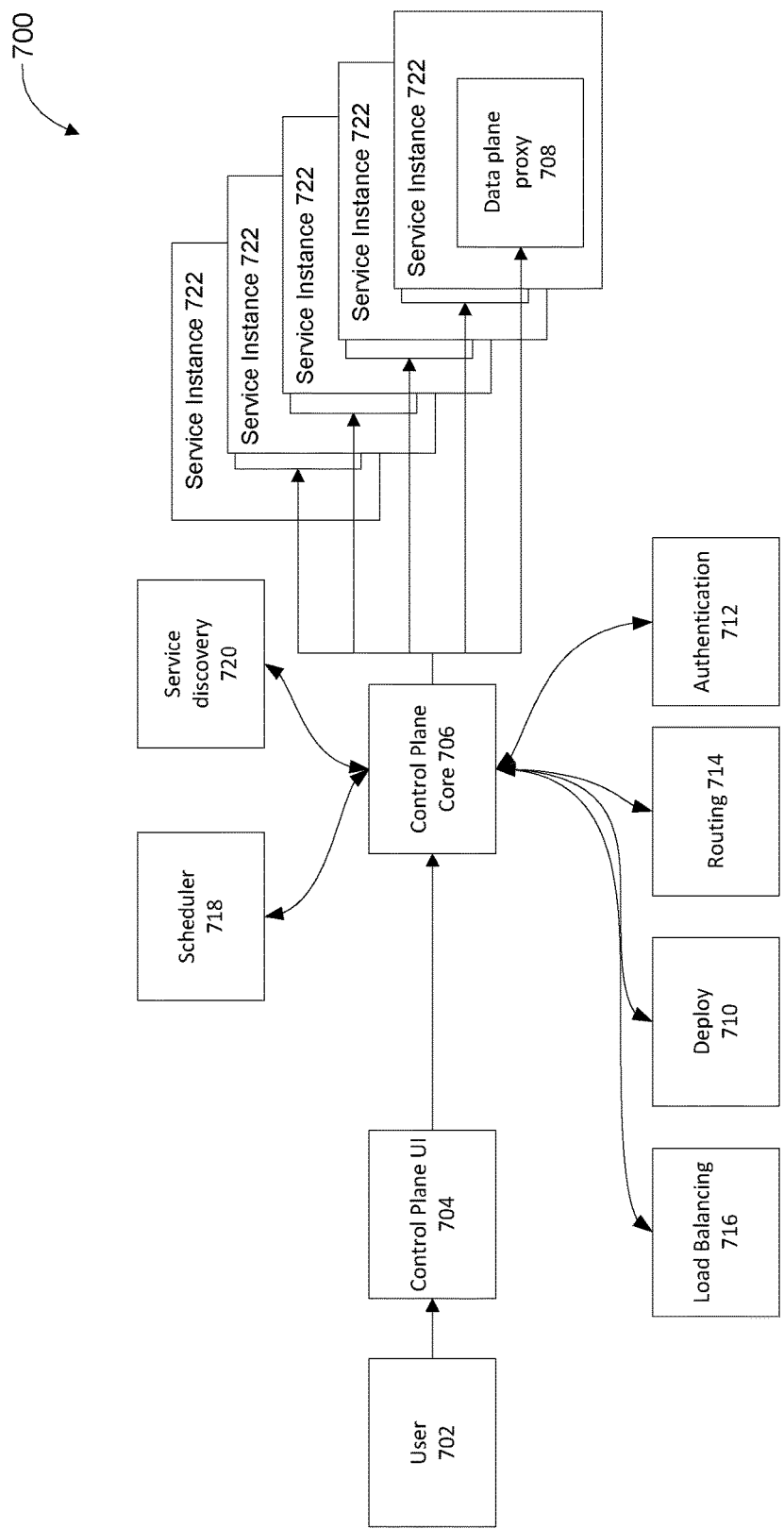
FIG. 7 is a block diagram of a control plane system for a service mesh in a microservices architecture

FIG. 7 is a block diagram of a control plane system 700 for a service mesh in a microservices architecture. A service mesh data plane is controlled by a control plane. In a microservices architecture, each microservice typically exposes a set of what are typically fine-grained endpoints, as opposed to a monolithic application where there is just one set of (typically replicated, load-balanced) endpoints. An endpoint can be considered to be a URL pattern used to communicate with an API.

Service mesh data plane: Touches every packet/request in the system. Responsible for service discovery, health checking, routing, load balancing, authentication/authorization, and observability.

Service mesh control plane: Provides policy and configuration for all of the running data planes in the mesh. Does not touch any packets/requests in the system but collects the packets in the system. The control plane turns all the data planes into a distributed system.

A service mesh such as Linkerd, NGINX, HAProxy, Envoy co-locate service instances with a data plane proxy network proxy. Network traffic (HTTP, REST, gRPC, Redis, etc.) from an individual service instance flows via its local data plane proxy to the appropriate destination. Thus, the service instance is not aware of the network at large and only knows about its local proxy. In effect, the distributed system network has been abstracted away from the service programmer. In a service mesh, the data plane proxy performs a number of tasks. Example tasks include service discovery, health checking, routing, load balancing, authentication and authorization, and observability.

Service discovery identifies each of the upstream/backend microservice instances within used by the relevant application. Health checking refers to detection of whether upstream service instances returned by service discovery are ready to accept network traffic. The detection may include both active (e.g., out-of-band pings to an endpoint) and passive (e.g., using 3 consecutive 5xx as an indication of an unhealthy state) health checking. The service mesh is further configured to route requests from local service instances to desired upstream service clusters.

Load balancing: Once an upstream service cluster has been selected during routing, a service mesh is configured load balance. Load balancing includes determining which upstream service instance should the request be sent; with what timeout; with what circuit breaking settings; and if the request fails should it be retried?

The service mesh further authenticates and authorizes incoming requests cryptographically using mTLS or some other mechanism. Data plane proxies enable observability features including detailed statistics, logging, and distributed tracing data should be generated so that operators can understand distributed traffic flow and debug problems as they occur.

In effect, the data plane proxy is the data plane. Said another way, the data plane is responsible for conditionally translating, forwarding, and observing every network packet that flows to and from a service instance.

The network abstraction that the data plane proxy provides does not inherently include instructions or built-in methods to control the associated service instances in any of the ways described above. The control features are the enabled by a control plane. The control plane takes a set of isolated stateless data plane proxies and turns them into a distributed system.

A service mesh and control plane system 700 includes a user 702 whom interfaces with a control plane UI 704. The UI 704 might be a web portal, a CLI, or some other interface. Through the UI 704, the user 702 has access to the control plane core 706. The control plane core 706 serves as a central point that other control plane services operate through in connection with the data plane proxies 708. Ultimately, the goal of a control plane is to set policy that will eventually be enacted by the data plane. More advanced control planes will abstract more of the system from the operator and require less handholding.

The control plane services may include global system configuration settings such as deploy control 710 (blue/green and/or traffic shifting), authentication and authorization settings 712, route table specification 714 (e.g., when service A requests a command, what happens), load balancer settings 716 (e.g., timeouts, retries, circuit breakers, etc.), a workload scheduler 718, and a service discovery system 720. The scheduler 718 is responsible for bootstrapping a service along with its data plane proxy 718. Services 722 are run on an infrastructure via some type of scheduling system (e.g., Kubernetes or Nomad). Typical control planes operate in control of control plane services 710-720 that in turn control the data plane proxies 708. Thus, in typical examples, the control plane services 710-720 are intermediaries to the services 722 and associated data plane proxies 708.

As depicted in FIG. 7, the control plane core 706 is the intermediary between the control plane services 710-720 and the data plane proxies 708. Acting as the intermediary, the control plane core 706 removes dependencies that exist in other control plane systems and enables the control plane core 706 to be platform agnostic. The control plane services 710-720 act as managed stores. With managed storages in a cloud deployment, scaling and maintaining the control plane core 706 involves fewer updates. The control plane core 706 can be split to multiple modules during implementation.

The control plane core 706 passively monitors each service instance 722 via the data plane proxies 708 via live traffic. However, the control plane core 706 may take active checks to determine the status or health of the overall application.

The control plane core 706 supports multiple control plane services 710-720 at the same time by defining which one is more important through priorities. Employing a control plane core 706 as disclosed aids control plane service 710-720 migration. Where a user wishes to change the control plane service provider (ex: changing service discovery between Zookeper based discovery to switch to Consul based discovery), a control plane core 706 that receives the output of the control plane services 710-720 from various providers can configure each regardless of provider. Conversely, a control plane that merely directs control plane services 710-720 includes no such configuration store.

Another feature provided by the control plane core 706 is Static service addition. For example, a user may run Consul, but you want to add another service/instance (ex: for debugging). The user may not want to add the additional service on the Consul cluster. Using a control plane core 706, the user may plug the file-based source with custom definition multi-datacenter support. The user may expose the state hold in control plane core 706 as HTTP endpoint, plug the control plane core 706 from other datacenters as a source with lower priority. This will provide fallback for instances in the other datacenters when instances from local datacenter are unavailable.

Service Group Discovery and Observation

Figure 8:
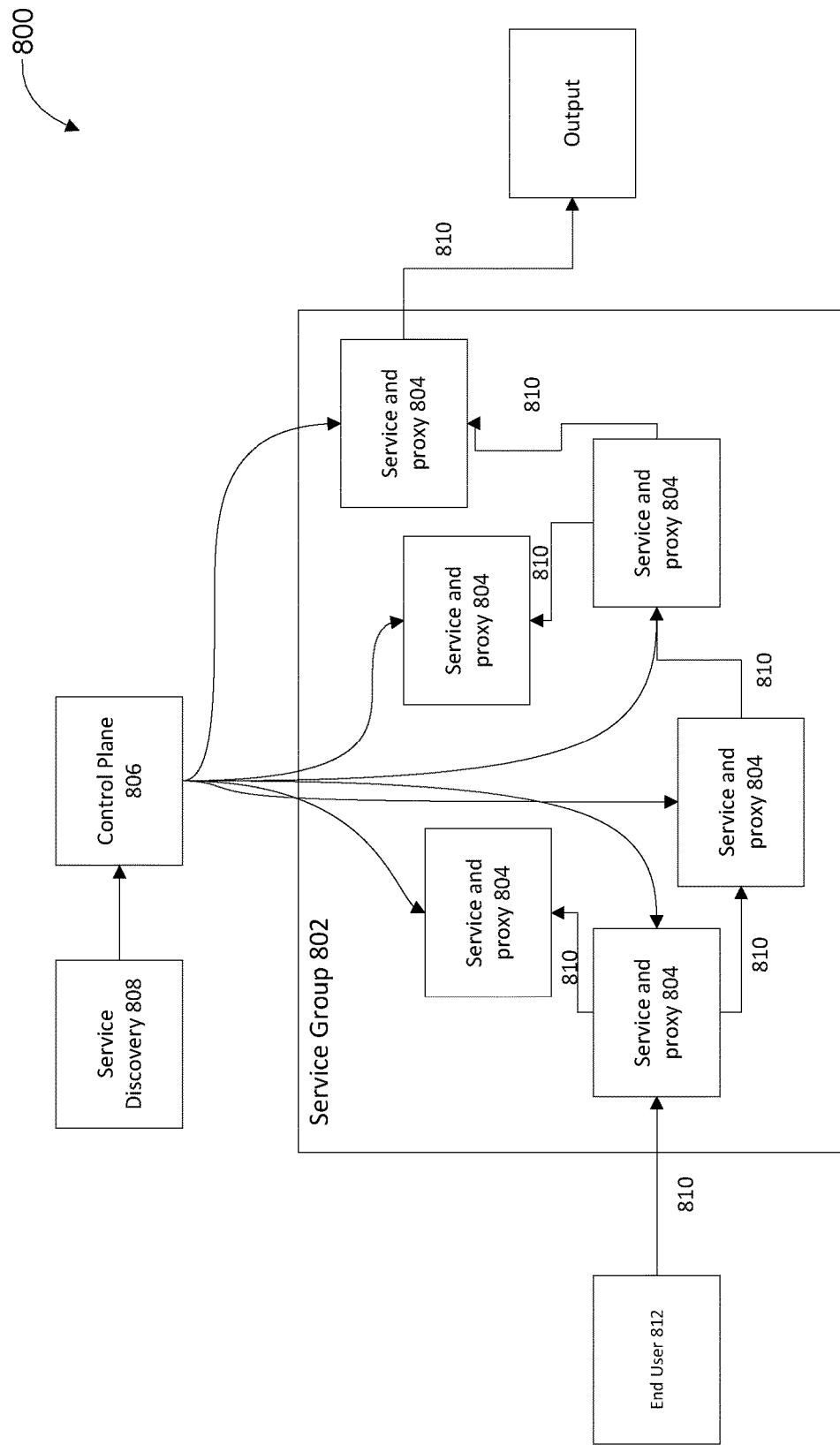
FIG. 8 is a block diagram illustrating service groups and features associated with identification thereof.

FIG. 8 is a block diagram illustrating service groups 802 and features associated with identification thereof. A service group 802 is a group of services 804 that together perform an identifiable application purpose or business flow. For example, a set of microservices are responsible for an airline's ticketing portion of their website. Other examples may include "customer experience," "sign up," "login," "payment processing", etc. Using a control plane 806 with an associated service discovery 808 feature, packets are be monitored as they filter through the overall application (ex: whole website).

Given a starting point of a given service group 802, the control plane 806 may run a trace on packets having a known ID and follow where those packets (with the known ID) go in the microservice architecture as tracked by data plane proxies. In that way, the system can then automatically populate a service group 802 using the trace. The trace is enabled via the shared execution path of the data plane proxies. Along each step 810 between services 804, the control plane 804 measures latency and discover services. The trace may operate on live traffic corresponding to end users 812, or alternatively using test traffic.

As output, the control plane generates a dependency graph of the given service group 802 business flow and reports via a graphic user interface (GUI). Using the dependency graph, a backend operator is provided insight into bottlenecks in the service group 802. For example, in a given service group 802, a set of services 804 may run on multiple servers that are operated by different companies (e.g., AWS, Azure, Google Cloud, etc.). The latency between these servers may slow down the service group 802 as a whole. Greater observability into the service group 802 via a dependency graph enables backend operators to improve the capabilities and throughput of the service group 802.

Figure 9:
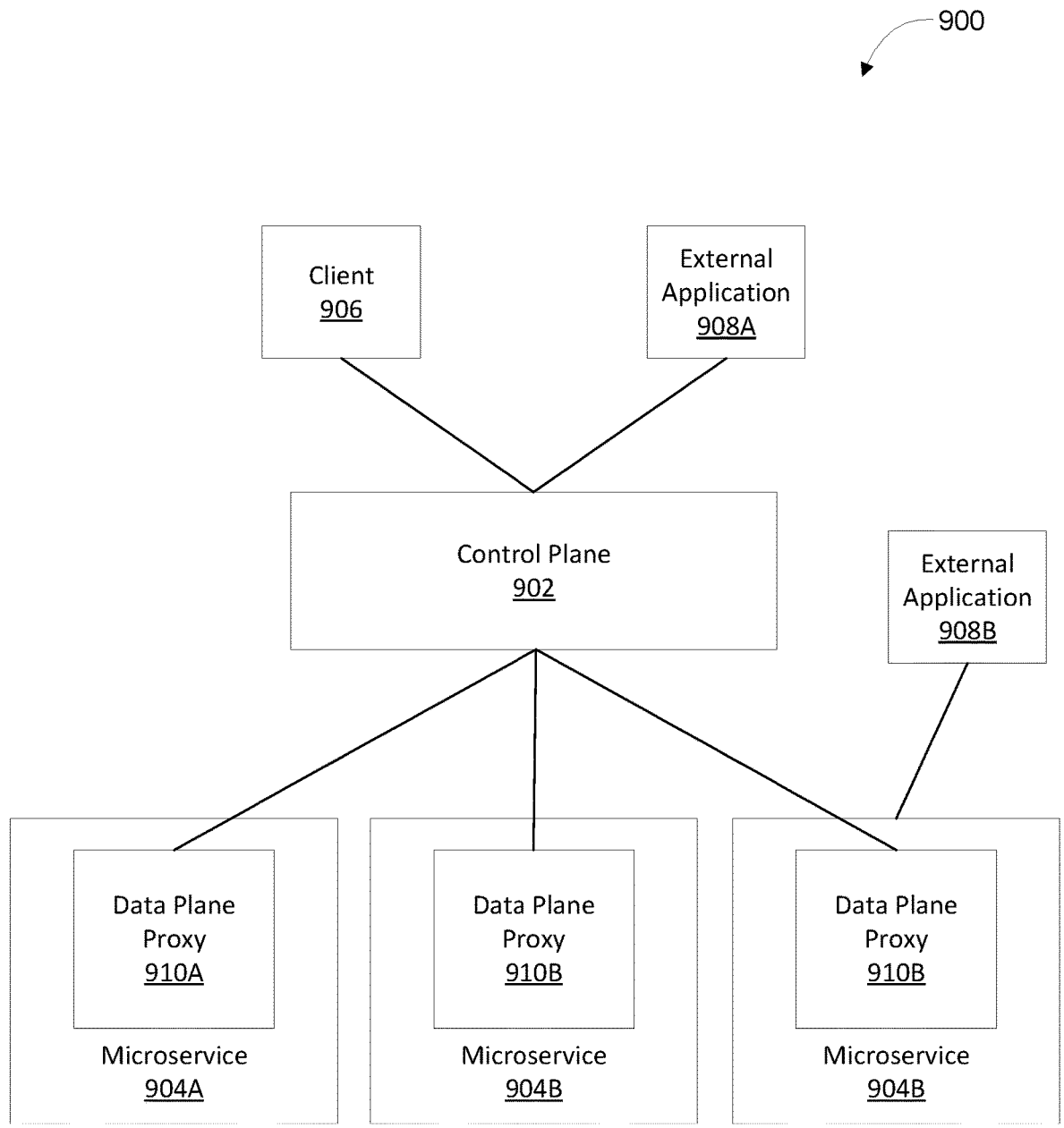
FIG. 9 is a block diagram illustrating an example environment of a control plane and a plurality of microservices.

FIG. 9 is a block diagram illustrating an example environment 900 of a control plane 902 and a plurality of microservices 904. The control plane 902 is connected to a plurality of microservices 904, a client 906, and an external application 908A (referred to collectively herein as components). In some embodiments, additional or alternative components to those shown in FIG. 9 are connected (either directly or via the network 908) to the control plane 902. For example, in some embodiments, any number of microservices 904, rather than the three shown in FIG. 9, connect to the control plane 902.

In some embodiments, the control plane 902 connects to the components via a network. The network is any collection of distinct networks operating wholly or partially in conjunction to provide connectivity to/from between the components. In one embodiment, network communications can be achieved by, an open network, such as the Internet, or a private network, such as an intranet and/or the extranet. Examples of the network include a telephonic network, an open network, such as the Internet, or a private network, such as an intranet and/or the extranet. For example, the Internet provides file transfer, remote login, email, news, RSS, and other services through any known or convenient protocol, such as, but not limited to the TCP/IP protocol, Open System Interconnections (OSI), FTP, UPnP, iSCSI, NSF, ISDN, PDH, RS-232, SDH, SONET, etc.

The control plane 902 links the plurality of microservices 904 for a microservice architecture application. The control plane 902 communicates with the microservices 904 to facilitate running the microservice architecture application. For example, the control plane 902 is enabled to send instructions for configuring settings of the microservices 904 and send data for the microservice architecture application to the microservices 904 for processing. The control plane 902 is configured to receive outputs from the microservices 904 for the processing, which allows the control plane 902 to maintain an overview of how the microservices 904 are operating for the microservice architecture application.

The control plane 902 also links a client 906 with the plurality of microservices 904 for the microservice architecture application. The control plane 902 receives inputs from the client 906 and configures one or more of the microservices 904 based on the inputs to perform services for the microservice architecture application. For example, the control plane 902 receives an input from the client 906 that causes the control plane 902 to configure a first microservice 904A with an event hook, the latest version of a plugin, or a new plugin. The control plane 902 also communicates output data received from the microservices 904 to the client 906. Though only one client 906 is shown in FIG. 9, in some embodiments, the control plane 902 links any number of clients 906 to the plurality of microservices 904.

The control plane 902 further links an external application 908A to the plurality of microservices 904. The external application 908 is associated with an external system and communicates with the control plane 902 for the microservice architecture application. For example, in one embodiment, the external application 908 is a messaging program configured to send messages to the client (directly or via the control plane 902). The control plane 902 observes events that occur at the external application 908A such that the control plane 902 runs a handler when a particular event occurs at the external application 908A. The control plane 902 also requests information from the external application 908 for the microservices 904 and sends information about processes running at the microservices 904 to the external application 908. Though only one external application 908A is shown as being connected to the control plane 902 in FIG. 9, the control plane 902 is enabled to serve as a link between any number of external applications 908 and the plurality of microservices 904 as necessary based on the configuration of a subject microservice application.

In some embodiments, a microservice 904C of the plurality of microservices 904 connects to an external application 908B. The microservice 904C communicates with and/or observes output data from the external application 908B via a gateway node (such as gateway node 206 in FIG. 2) or via the network. In some embodiments, the microservice 904C monitors events that occur at the external application 908B. For example, the control plane 902 configures the microservice 904C with to monitor the external application 908B for an event occurrence. The microservice 904C access output data from the external application 908B. When the microservice 904C determines that the event occurred at the external application 908B, the microservice 904C notifies that control plane 902. Though only one external application 908 is shown in FIG. 9, in other embodiments, the control plane 902 may link any number of external applications 908 to the plurality of microservices 904. In other embodiments than that shown in FIG. 9, any number of microservices 904 may be connected to the external application 908B or other external applications.

Each microservice 904 is an API (such as API 208 or API 312 or service instance 722) that performs actions for the microservice architecture application and is configurable based on communications received from the control plane 902. Each microservice 906 communicates with the control plane 902 via a data plane proxy 910 at the microservice 906C. The control plane 902 sends configuration instructions and input data to each microservice 904 and receives output data from each microservice 904. However, the control plane 902 cannot directly observe a microservice's 904 settings, so the control plane 902 must request current settings from a microservice 904 to determine what settings the microservice 904 is operating under.

The microservice architecture application is a computer program that performs one or more functions. The microservice architecture application is facilitated by the control plane 902 such that processes for running the microservice architecture application are distributed among the plurality of microservices 904 connected to the control plane 902. In some embodiments, the control plane 902 facilitates the processing of multiple microservice architecture applications by distributing the processes for the microservice architecture applications across the plurality of microservices 904. For instance, the control plane 902 may break down the processing required for each microservice architecture application into a set of processes and determine for each process how much computing power, memory, storage, and the like is needed for performing the process.

The control plane 902 requests data indicating the ability (e.g., graphics processing units available, storage available, etc.) of one or more microservices 904 to run the processes and selects a microservice for each process based on this data. In addition, the control plane 902 monitors the ability of the microservices over time to redistribute processes among the microservices based on this data.

The control plane 902 monitors microservices 904 as the microservices 904 perform operations for the microservice architecture application. When instantiating the microservice architecture application, the control plane selects a plurality of microservices 904 to each perform a process for the microservice architecture application. The control plane 902 sends, to each microservice 904, instructions for configuring the settings of the microservice 904 to perform the process and send input data for the process. The control plane 902 stores a record of the instructions and the settings in a database. The database is located within the control plane 902. In alternate embodiments, the database is connected to the control plane 902 via the network. In some embodiments, the control plane 902 stores the record in relation to a time the instructions were sent. Further, the control plane 902 may store the data in relation to an identifier of the microservice 904 such that the control plane 902 can query the database with the identifier to retrieve instructions, settings, event hooks, plugins, and the like associated with the microservice 904.

In some embodiments, the control plane 902 communicates (e.g., sends input data for processing, sends instructions for setting configuration, and/or receives output data) with the microservices 904 via one or more data plane proxies 906. A data plane proxy 906 functions as an intermediary between the control plane 902 and one or more microservices 904 to provide security and privacy and control the requests sent between the control plane 902 and the microservices 904. The data plane proxies 906 function like the gateway nodes 206, 308, 604 described in relation to FIGS. 2-6 or the proxies 708, 804 described in relation to FIGS. 7-8. In some embodiments, a data plane proxy 906 serves as a gateway for a single microservice 904A of the plurality of microservices 904 employed for the microservice architecture application. For example, the data plane proxy 906 may function as a gateway between the microservice 904A and an external application 908, a client 906, and/or the control plane 902.

In other embodiments, a data plane proxy 906 serves as a gateway for a subset or all of the plurality of microservices employed for the microservice architecture application. Further, in certain embodiments, the data plane proxies 906 each store subsets of the database at the request of the control plane 902. For instance, the control plane 902 requests that a data plane proxy 906C store a subset of the database related to associated microservice 904C. Though data plane proxies 906 act as gateways for communication between the control plane 902 and microservices 904 in a plurality of embodiments, for simplicity, the communications are often described herein as occurring directly between the control plane 902 and the microservices 904.

The control plane 902 communicates information for the microservice architecture application with the client 906. The control plane 902 transmits GUIs with this information for display to the client 906. A GUI includes interactive elements that the client 906 may interact with to display the information for the microservice architecture application. The client 906 selects interactive elements based on the information desired to be displayed and to send input data to the control plane 904 for the microservice architecture application. For example, the client 906 inputs configurations for one or more selected microservices 904 via a GUI. Other actions made by the client 906 via the GUI include selecting an external application 908 to connect to the microservices 904, inputting selection criteria (e.g., geography, region, time zone, processing power, etc.) for which microservices 904 to employ for the microservice architecture application, and the like. The control plane 902 communicates information about the client's interactions with the GUI to the other components and updates the GUI based on the interactions and output data from the other components.

The control plane 902 receives event hooks from the client 906. In some embodiments, the control plane 902 additionally receives an identifier of a component to configure the event hook with or selection criteria for choosing a component to configure the event hook with. The selection criteria include a geographic region, time zone, time range, amount of available storage, and the like of the component. For example, the client 906 may send an indication that the event hook needs to be configured on a microservice 904 that is in the northern hemisphere.

An event hook is a callback routine that operates asynchronously when an event occurs. Each event hook defines an event, a source, and a handler. An event is an occurrence that happens at a component (e.g., an observable event) or an occurrence that happens irrespective of the components (e.g., an inherent event). Examples of observable events include receiving a user input at the client 906, receiving output data from a first microservice 904A, receiving an indication that a background process occurred at the external application 908, receiving an indication that a new administrator of the microservice architecture application was created, and receiving an indication that a plugin was installed. Examples of inherent events include passing a time of day, reaching a date, and concluding a time period. In some embodiments, an event hook specifies multiple events that each need to occur for the event hook to run. In some embodiments, an event hook specifies multiple events, at least one of which needs to occur for the event hook to run. In some embodiments, an event hook specifies a single event that needs to occur for the event hook to run.

A source of an event hook is the component where an event of the event hook is to occur. Example sources are the control plane 902, a microservice 904, the client 906, an external application 908, or a data plane proxy 910. In some embodiments, the source is a specific field of a software program running on one of the components in the example environment 900. In one example, the source is a second string in a tuple located at the external application 908A. In some embodiments, an event hook specifies multiple sources that an event may occur at for the event hook to run.

A handler of an event hook is an action that is triggered by an event occurring at a source. In some embodiments, the handler includes a payload that is transmitted during the action. The handler runs at the control plane 902, a microservice 904, or a data plane proxy 910 (e.g., internal components of the example environment 900). Examples of handlers include sending a notification, sending a request, submitting a document, changing configuration settings of a webpage, changing configuration settings of a microservice 904, triggering a function, building a request, enforcing a set of constraints (e.g., that all administrators are associated with a particular type of username), and the like. In some embodiments, an event hooks specifies multiple handlers to run when an event occurs at a source.

In some embodiments, an event hook is structured in an initial configuration upon receipt from a client 906. In creating an event hook using the initial configuration, a client 906 accesses data a gateway node 106 to determine a source and event for a particular handler. The client 906 inputs the event, source, and handler in the initial configuration, where the event is at a first level, the source is at a second level, and the handler is at a third level.

The control plane 902 stores received event hooks in the database in association with an identifier of the internal component to be configured with the event hook. In some embodiments, when the client 906 does not indicate an internal component to configure the event hook with, the control plane 902 allocates an internal component based on selection criteria sent with the event hook and/or the ability of the internal component to run the handler. For instance, the control plane 902 determines whether each internal component has the necessary processing capabilities to run the handler and meets the selection criteria. If multiple internal components are available to run the handler, the control plane 902 selects among the internal components randomly or based on location of the client 906, historical data of the internal component, or any other criteria available for selection.

For each event hook, the control plane 902 configures the identified internal component with the event hook. In some embodiments, the control plane 902 accesses settings of the internal component and updates the settings so that the internal component runs the handler when the internal component receives an indication that the event occurred at the source. In other embodiments, the control plane 902 determines configuration instructions for configuring the internal component with the event hook and sends the configuration instructions to the internal component.

In some embodiments, the control plane 902 sends the event hook to a data plane proxy 910A of a microservice 904A. The data plane proxy 910A parses the event hook into the event, source, and handler. For example, the data plane proxy 910A may access stored documentation about the structure of the event hook (e.g., from the database at the control plane or at an endpoint). The documentation indicates, for example, that an event hook includes three levels, where the first level is the event, the second level is the source, and the third level is the handler. The data plane proxy 910A uses this information to extract the event, source, and handler from the event hook and configure the microservice 904 to run the handler when the event occurs at the source. In other embodiments, the control plane 902 sends configuration instructions to the data plane proxy 904A, which the data plane proxy 910A uses to configure the microservice 904A with the event hook.

One or more of the internal components monitor for the occurrence of the event at the source. In some embodiments, the internal component configured with the event hook monitors the source for the event's occurrence. For example, first data plane proxy 910C, based on instructions from the control plane 902, configures a microservice 904C with a first event hook that includes a first event, first source, and first handler. The microservice 904C observes output data at an external application 908B that creates a set of directions for navigating between locations. If external application 908B (e.g., the first source) outputs directions that include traveling through a specific geographic region (e.g., the first event), the microservice 904C runs the first handler.

In other embodiments, control plane 902 designates an internal component to monitor for the occurrence of the event at the source. The control plane 902 designates an internal component based on processing ability and computing resource availability. In one example, the control plane 902 is configured with a second event hook that includes a second event, second source, and a second handler. The control plane 902 designates a first microservice 904A to monitor a second microservice 904B (e.g., the second source) for the second event. If the second microservice 904B outputs data indicative of running a function (e.g., the second event), the first microservice 904A notifies the control plane 902 that the event occurred at the source, and the control plane runs the second handler.

In some embodiments, the control plane 902 selects a data plane proxy 910C to configure the event hook with. For example, the control plane 902 selects a third data plane proxy 910C for a third event hook that includes a third event, third source, and third handler. The third data plane proxy 910C configures itself to run the third handler when the third event occurs at the third source. Thus, when the control plane 902 receives, from a client 906 (e.g., the third source) a request for data from a third microservice 904C (e.g., the third event), the data plane proxy 910C sends output data form the third microservice 904C to the control plane 902 (e.g., the third handler). Further examples of handlers include building a request, sending a request to a component, connecting to a new microservice 904, new client 906, or new external application 908, disconnecting from a microservice 904, client 906, or external application 908, logging the event at a microservice 904 or the database, reallocating one or more microservices 904, and triggering a function. Other examples of handlers include sending a preformatted POST request to a designated component, building a custom HTTP request using a combination of verbs, headers, and/or payloads, logging the event and/or a payload at the database or a microservice 904, removing a plugin, installing a plugin, mapping events, and triggering a Lua function.

In one example, the control plane 902 uses an event hook to receive notifications that a microservice 904 (or other upstream component) being used for an external application 908 is unreachable. The first event hook includes the event "health," the source "balancer," and the handler "webhook-custom." The handler is configured to send a POST request with text (e.g., the payload) to a specified URL. In some embodiments, the handler is configured via a config parameter to be a JSON post. A client 906 uses the following code to cause the control plane 902 to implement the event hook.
{
 "event": "health",
 "source": "balancer",
 "handler": "webhook-custom"
 "config":
  "headers": {
    "Content-Type": "application/json"
  },
  "payload": {
    "text": "Upstream {{upstream_id}} is {{health}}. Tried to connect to port {{port}} on {{hostname}} or {{ip}}",
    "blocks": "[\"type\": \"header\", \"text\": {\"type\": \"plain_text\", \"text\": \"Upstream is {{health}}\", \"emoji\"; true}, {\"typer\": \"section\", \"fields\": [{\"type\": \"mrkdwn\", \"text\": \"*Upstream:*\\n{{upstream_id}}\"}, {\"type\": \"mrkdwn\", \"text\": \"*Port:\\n{{port}}\"}]}, {\"type\": \"section\", \"fields\": [{\"type\": \"mrkdwn\", \"text\": \"*Hostname:*\\nn{{hostname}}\"}, {\"type\": \"mrkdwn\", \"text\": \"*IP:*\\n{{ip}}\"}]}]"
  }
  "url": "[insert URL here]"
  "method": "POST"
 }
}

Once the event hook has been implemented, the control plane 902 sends notifications at the URL when a microservice 904 or other upstream component is healthy or unhealthy.

In one example, the control plane 902 uses an event hook to send notifications when new administrators are created. For the event hook, the event is "crud" (e.g., create, read, update, delete), the source is "admins:create" (where administrators are created), and the handler is logging the event. In another example, the control plane 902 uses an event hook that sends notifications about new administrator and ensure that new administers use a particular domain name. Once the event hook has been implemented, the control plane 902 receives a notification when a new administrator is created. The control plane 902 checks that the domain name associated with the new administrator matches the particular domain name. If not, the control plane 902 deletes the new administrator's account and notifies the client 906 that the administrator was removed.

Event hooks may be implemented for a variety of purposes. For instance, example implementations of an event hook by an administrator include health checks, audit logging, and policy enforcement. For example, an event hook for health checking has "balancer" as a source and "health" as an action, where the handler runs a health check when run. Thus, when the balancer at an endpoint receives an indication that its health is below optimal (e.g., the action), the event hook is configured to perform a health check for the endpoint. In another example, an event hook is used for audit logging. In this example, the source is "admins:create" and the action is "crud" (e.g., create, read, update, and delete). Thus, when a new administrator is created, the handler "log" runs, resulting in the creation of the administrators being logged. This log can be used for auditing purposes. In another example, an event hook is used for policy enforcement of all administrators having a particular type of email address. Here, the source is still "admin:create" and the action is "crud." The handler is "url":"http://<your host>/admin-created". The event hook runs when a new administrator is created, and the handler causes the administrator to be deleted if their email is not of the email type specified at the handler.

Figure 10:
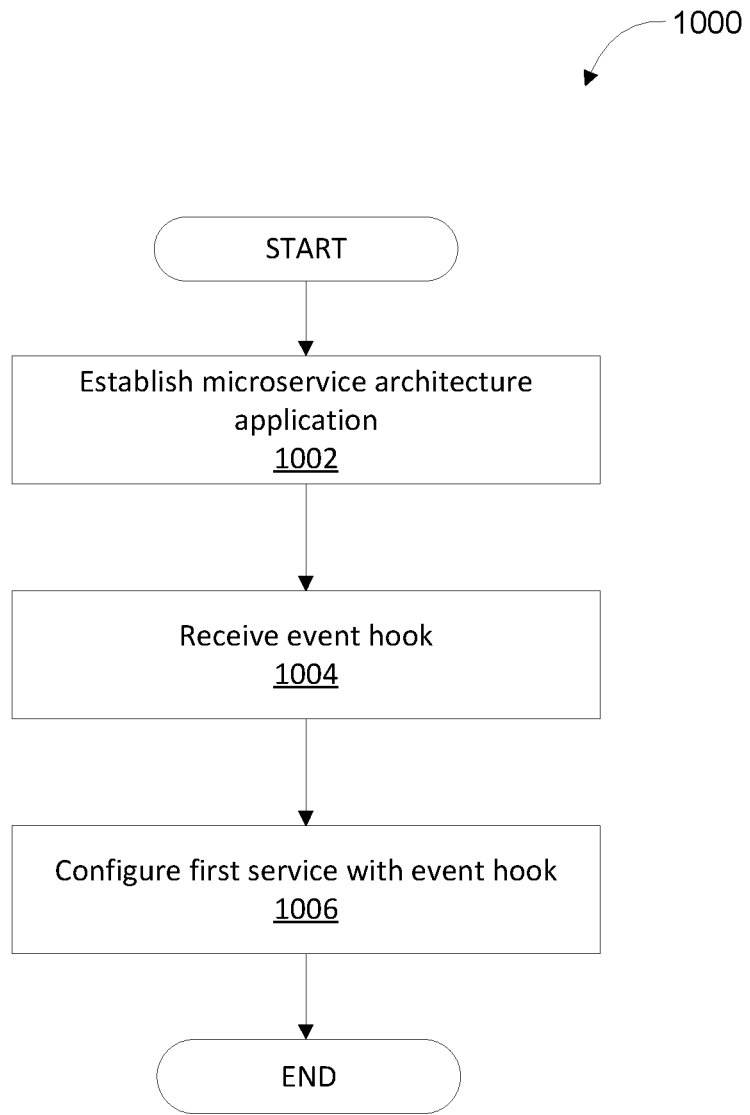
FIG. 10 is a flowchart illustrating a process for configuring a microservice with an event hook.

FIG. 10 is a flowchart 1000 illustrating a process for configuring a microservice 904 with an event hook. Though the embodiment described in the flowchart 1000 centers around configuring a microservice 904 with an event hook, in some embodiments, additional or alterative internal components may be configured with the event hook. For example, the control plane 902 may configure itself with the event hook. In another example, the control plane 902 instructs a data plane proxy 910 to configure itself with the event hook.

At step 1002, the control plane 902 establishes a microservice architecture application. The microservice architecture application performs a plurality of processes distributed across the plurality of microservices 904. In some embodiments, the control plane 902 facilitates the processing of multiple microservice architecture applications for multiple clients 906. For instance, the control plane communicates with plurality of clients 906 to run a microservice architecture application for each client 906. The control plane receives requests from clients 906 for establishing new microservice architecture applications. Each request includes one or more processes to be performed for the client 906 and a set of selection criteria for determining which microservices 904 to use for the one or more processes. Examples of selection criteria include geographical locations or time zones of the microservices 904, processing power/memory needed for the processes, or any other requirements that dictate which microservices 904 to use. When the control plane receives a request from a first client 906, the control plane 902 selects a subset of the plurality of microservices 904 for a first microservice architecture application based on the request. The control plane 902 instantiates the first microservice architecture application by distributing the processes of the request across the subset of microservices 904. The distribution enables each microservice 904 in the subset to perform a piecemeal function of an overall application function, which includes the processes, for the first microservice architecture application.

At step 1004, the control plane 902 receives an event hook from the first client 906. The event hook includes a first event, a first source, and a first handler and is used to configure a first microservice 904A to run the handler when the event occurs at the source. In some embodiments, the event hook includes multiple events, sources, and handlers. For example, a first event hook includes the first event, a second event, the first source, and the first handler. Once the first microservice 904A is configured with the event hook, the first microservice 904A runs the first handler when both the first and second event occur at the source. In another example, a second event hook includes the first event, the first source, the first handler, and a second handler. The first microservice 904A (once configured with the second event hook) runs the first and second handler in response to the first event occurring at the first source. In yet another example, a third event hook includes the first event, the first source, a second source, and the first handler. In response to the first event occurring at the first and second source, the first microservice 904 (once configured with the third event hook) runs the first handler. In other embodiments, an event hook may include any combination of events, sources, and handlers.

At step 1006, the control plane 902 configures the first microservice 904A with the first event hook. For instance, the control plane 902 sends the first event hook to a first data plane proxy 910A at the first microservice 904A. The first data plane proxy 910A configures the first microservice 904A to run the first handler in response to the first event occurring at the first source. In some embodiments, the control plane 902 configures itself and/or the data plane proxy 910A with event hook. For example, the control 902 sends configuration instructions to a data plane proxy 910A that cause the data plane proxy to configure itself to run the first handler when the first event occurs at the first source.

The control plane 902 designates an internal component to monitor for occurrence of the first event. In some embodiments, the first client 906 specified the internal component along with the event hook, so the control plane 902 instructs the specified internal component to monitor for the event. For example, the control plane 902 sends instructions to a second data plane 910B of a second microservice 904B to configure the second microservice 904B to monitor an external application 908 (e.g., the first source) for the first event. In other embodiments, the control plane 902 selects an internal component for monitoring based on availability and processing power of the internal components. For example, the control plane 902 selects itself due to lack of availability of other internal components and configures itself to monitor a client 902 (e.g., the first source in this example) for the first event.

The designated internal component monitors the first source for the first event. Upon detection of the first event at the first source, the designated internal component notifies the first microservice 904A that the first event occurred at the first source. In embodiments where the designated internal component is not in direct communication with the first microservice 904A, the designated internal component sends a notification of the events occurrence to a directly connected internal component. For example, if the control plane 902 detects the event occurrence, the control plane 902 notifies the first data plane proxy 910A, which in turn notifies the first microservice 904A. In another example, if a second microservice 904B detects the event occurrence, the second microservice 904B notifies a second data plane proxy 904B, which notifies the control plane 902 to notify the first data plane proxy 910A. The first data plane proxy 910A in turn notifies the first microservice 904A.

In some embodiments, alterative or additional steps or modules are used in the process shown in FIG. 10. For example, in some embodiments, the control plane 902 receives a notification from an external application 908 that the first event occurred at the first source. The control plane 902 transmits the notification to the first data plane proxy 910A to cause the first microservice 904A to run the first handler. In some embodiments, when the handler is run, the first microservice 904A sends a request to the external application 908, sends a request to the client 906, sends a request to a second microservice 904B, connects to the second microservice 904B, disconnects from the second microservice 904B, reallocates itself for the microservice architecture application, builds a request using a verb, a header, and a payload, logs the event at the database of the control plane 902, logs the event at a local database, triggers a function, and/or performs a function.

Figure 11:
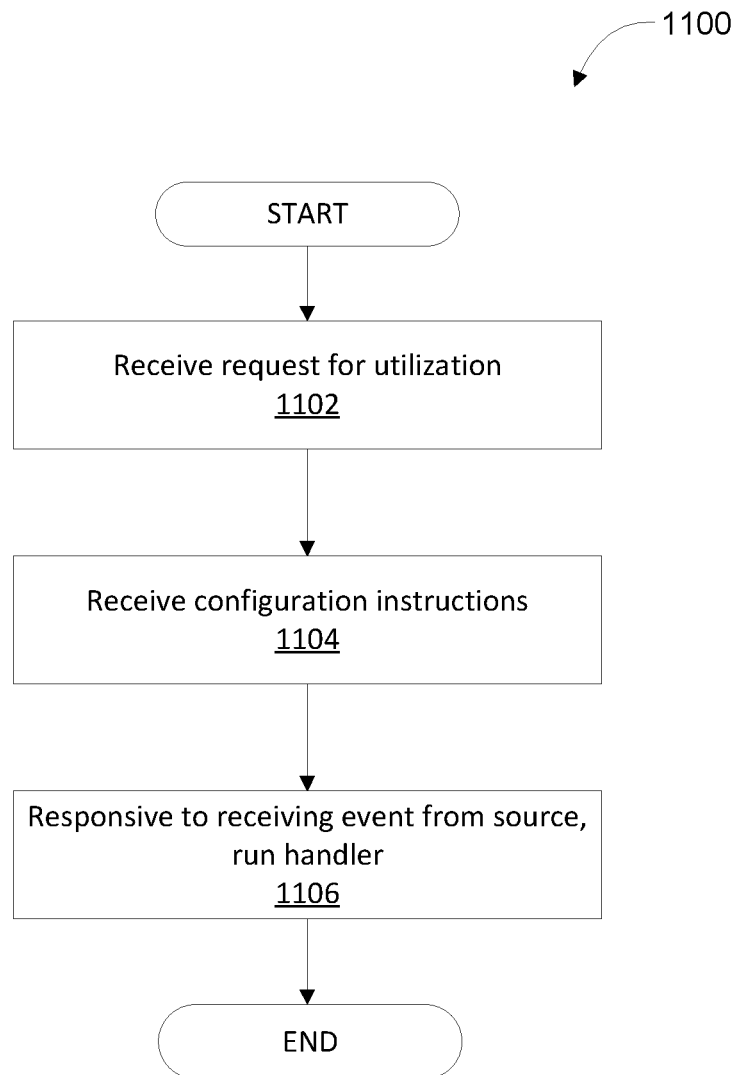
FIG. 11 is a flowchart illustrating a process for running a handler based on an event.

FIG. 11 is a flowchart 1100 illustrating a process for running a handler based on an event. Though steps of the flowchart 1100 are described in relation to a first microservice 904A, in other embodiments, another internal component performs the steps of the flowchart.

At step 1102, a first microservice 904A receives a request for utilization of the first microservice 904A from the control plane 902. The first microservice 904A is one of a plurality of microservices 904 connected to the control plane 902 for a microservice architecture application. Each microservice 904A in the plurality of microservices 904 includes a data plane proxy 910 that serves traffic for the microservice 904. Thus, the first microservice 904A receives the request via its associated data plane proxy 910A. The request for utilization includes a process for the first microservice 904A to run. The combination of the process run by the first microservice 904A and processes run at the other microservices 904 in the plurality result in an overall application function for the microservice architecture application.

At step 1104, the first microservice 904A receives, via its associated data plane proxy 910A, configuration instructions associated with an event hook. The event hook includes an event, a source, and a handler. In some embodiments, the event hook specifies multiple events, sources, and handlers. Based on the configuration instructions, the first microservice 904A configures itself to run the handler when the event occurs at the source.

At step 1106, responsive to the receiving a notification that the event occurred at the source, the first microservice 904A runs the handler. In some embodiments, the first microservice 904A runs multiple handlers in response to the notification. In further embodiments, the first microservice 904A runs the handler in response to receiving a first notification that the event occurred at the source or a second event occurred at a second source.

In some embodiments, alterative or additional steps or modules are used in the process shown in FIG. 10. For example, in some embodiments, the data plane proxy 910A configures itself to monitor for occurrence of the event and sends the notification to the first microservice 904. In further embodiments, the first microservice reallocates itself to another microservice architecture application managed by the control plane 902 responsive to receiving the notification.

Figure 12:
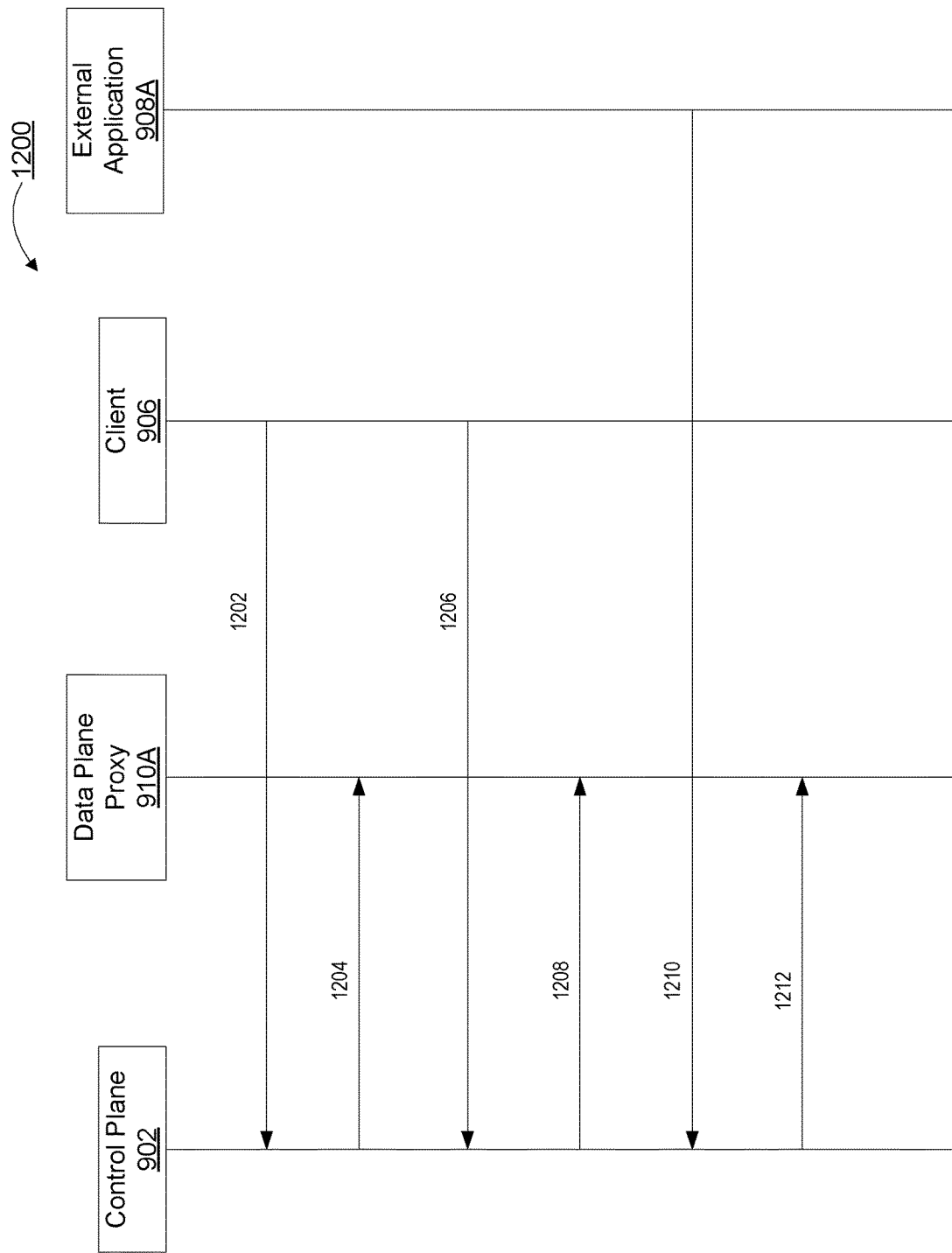
FIG. 12 is an interaction diagram illustrating example interactions between a control plane, data plane proxy, client, and external application.

FIG. 12 is an interaction diagram 1200 illustrating example interactions between the control plane 902, data plane proxy 910A, client 906, and external application 908A in the example environment 900 of FIG. 9. The interactions shown are examples of how the components interact, but in other embodiments, the components perform other interactions or perform interactions in another order than that shown in FIG. 12.

At step 1202, the client 906 sends a request to the control plane 902 to establish a microservice architecture application. The request includes one or more processes for the microservice architecture application for the control plane 902 to distribute among a plurality of microservices 904. At step 1204, the control plane sends requests for utilization to the plurality of microservices 904, including a request to a data plane proxy 910A of a first microservice 904A. At step 1206, the client 906 sends an event hook with an event, source, and handler to the control plane 902. In this example, the source is the external application 908A. In some embodiments, the client 906 indicates a particular microservice 904 to configure with the event hook. In other embodiments, the control plane selects the first microservice 904A from the plurality of microservices based on process distribution between the plurality of microservices 904 or availability of the microservices 904. At step 1208, the control plane 902 configures the first microservice 904A with the event hook by sending configuration instructions to the data plane proxy 910A. The configuration instructions, once implemented at the first microservice 904A causes the first microservice 904A to run the handler when the event occurs at the source.

At step 1210, the control plane 902 receives a notification from the external application 908 that the event occurred at the external application 908A. At step 1212, the control plane notifies the data plane proxy 910A that the event occurred at the external application 908A. The data plane proxy 910A notifies the first microservice 904A to run the handler responsive to the event occurring at the source. In some embodiments, the handler causes the first microservice 904A to run an internal process (e.g., running an internal function, processing a specific set of data, etc.). In other embodiments, the handler causes the first microservice 904A sends data to the control plane 902 that the control plane 902 stores at the database, sends to the client 906, or sends to the external application 908A.

Exemplary Computer System

Figure 13:
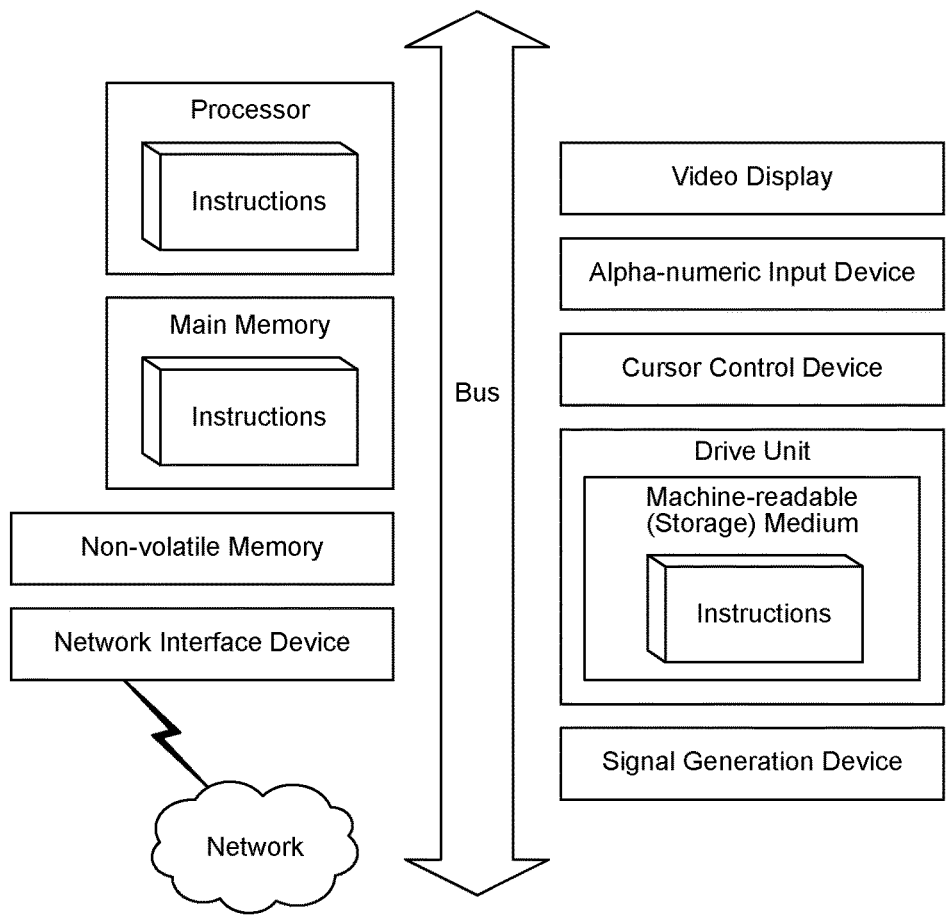
FIG. 13 depicts a diagrammatic representation of a machine in the example form of a computer system within a set of instructions, causing the machine to perform any one or more of the methodologies discussed herein, to be executed.

FIG. 13 shows a diagrammatic representation of a machine in the example form of a computer system 1300, within which a set of instructions for causing the machine to perform any one or more of the methodologies discussed herein may be executed.

In alternative embodiments, the machine operates as a standalone device or may be connected (networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone or smart phone, a tablet computer, a personal computer, a web appliance, a point-of-sale device, a network router, switch or bridge, or any machine capable of executing a set of instructions (sequential or otherwise) that specify actions to be taken by that machine.

While the machine-readable (storage) medium is shown in an exemplary embodiment to be a single medium, the term "machine-readable (storage) medium" should be taken to include a single medium or multiple media (a centralized or distributed database, and/or associated caches and servers) that store the one or more sets of instructions. The term "machine-readable medium" or "machine readable storage medium" shall also be taken to include any medium that is capable of storing, encoding or carrying a set of instructions for execution by the machine and that cause the machine to perform any one or more of the methodologies of the present invention.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine or computer-readable media include, but are not limited to, recordable type media such as volatile and non-volatile memory devices, floppy and other removable disks, hard disk drives, optical disks (e.g., Compact Disk Read-Only Memory (CD ROMS), Digital Versatile Discs, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

All patents, applications and references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will begin with the words "means for.") Accordingly, the applicant reserves the right to add additional claims after filing the application to pursue such additional claim forms for other aspects of the disclosure.

The invention claimed is:

1. A method comprising:
   establishing a microservice architecture application including a plurality of services, wherein the plurality of services are each an application program interface (API) performing a piecemeal function of an overall application function, each service including a data plane proxy that reports operation of the service to an application control plane;
   receiving an event hook that configures a first service of the plurality of services, wherein the event hook comprises an event, a source, and a handler; and
   configuring the first service of the plurality of services with the event hook, wherein the configuration causes the first service to run the handler responsive to receiving the event from the source.

2. The method of claim 1, further comprising:
   receiving, from an external application, a notification that the event occurred at the source.

3. The method of claim 2, wherein the external application is a messaging program.

4. The method of claim 1, further comprising:
   responsive receiving a notification that the event occurred at the source, sending a request to an external application.

5. The method of claim 4, wherein the request is a preformatted POST request.

6. The method of claim 1, further comprising:
   responsive to receiving a notification that the event occurred at the source, building a request using a verb, a header, and a payload.

7. The method of claim 6, wherein the request is a custom HTTP request.

8. The method of claim 1, further comprising:
   responsive to receiving a notification that the event occurred at the source, logging the event and a payload at a database of the application control plane.

9. The method of claim 1, further comprising:
   responsive to receiving a notification that the event occurred at the source, triggering a Lua function.

10. A system comprising:
    a computer processor; and
    a non-transitory computer-readable storage medium storing instructions that when executed cause the computer processor to perform actions comprising:
      establishing a microservice architecture application including a plurality of services, the plurality of services are each an application program interface (API) performing a piecemeal function of an overall application function, each service including a data plane proxy that reports operation of each service of the plurality of services to an application control plane;
      receiving an event hook that configures a first service of the plurality of services, wherein the event hook comprises an event, a source, and a handler; and
      configuring the first service of the plurality of services with the event hook, wherein the configuration causes the first service to run the handler responsive to receiving the event from the source.

11. The system of claim 10, further comprising: receiving, from an external application, a notification that the event occurred at the source.

12. The system of claim 11, wherein the external application is a messaging program.

13. The system of claim 10, further comprising:
responsive receiving a notification that the event occurred at the source, sending a request to a third party system.

14. The system of claim 13, wherein the request is a preformatted POST request.

15. The system of claim 10, further comprising:
responsive to receiving a notification that the event occurred at the source, building a request using a verb, a header, and a payload.

16. The system of claim 15, wherein the request is a custom HTTP request.

17. The system of claim 10, further comprising:
responsive to receiving a notification that the event occurred at the source, logging the event and a payload at a database of the application control plane.

18. The system of claim 10, further comprising:
responsive to receiving a notification that the event occurred at the source, triggering a Lua function.

19. A method comprising:
receiving, at a first service of a plurality of services connected via a microservice architecture application, a request for utilization of the first service, wherein the plurality of services are each an application program interface (API) performing a piecemeal function of an overall application function, each service including a data plane proxy that reports operation of the service to an application control plane;
receiving, at the first service from the application control plane, configuration instructions associated with an event hook, wherein the event hook comprises an event, a source, and a handler; and
responsive to receiving the event from the source, running the handler at the first service.

20. The method of claim 19, wherein the source is an application external to the microservice architecture application.

* * * * *